(12) United States Patent
Crowl et al.

(10) Patent No.: US 11,178,812 B1
(45) Date of Patent: Nov. 23, 2021

(54) STAND-ON MOWER FOLDING PLATFORM SYSTEM

(71) Applicant: Bad Boy, Inc., Batesville, AK (US)

(72) Inventors: Zachary Crowl, Batesville, AK (US); Kenny Cox, Batesville, AK (US)

(73) Assignee: Bad Boy Mowers, LLC, Batesville, AR (US)

( * ) Notice: Subject to any disclaimer, the term of this patent is extended or adjusted under 35 U.S.C. 154(b) by 233 days.

(21) Appl. No.: 16/544,380

(22) Filed: Aug. 19, 2019

(51) Int. Cl.
*A01D 34/64* (2006.01)
*A01D 34/82* (2006.01)
*B62D 51/02* (2006.01)
*A01D 101/00* (2006.01)

(52) U.S. Cl.
CPC ............. *A01D 34/64* (2013.01); *A01D 34/82* (2013.01); *B62D 51/02* (2013.01); *A01D 2101/00* (2013.01); *B60Y 2200/223* (2013.01)

(58) Field of Classification Search
CPC .... A01D 34/64; A01D 34/82; A01D 2101/00; B62D 51/02; B60Y 2200/223
USPC .......................................................... 56/16.7
See application file for complete search history.

(56) References Cited

U.S. PATENT DOCUMENTS

| | | | |
|---|---|---|---|
| 2,442,831 A | 6/1948 | Suttles | |
| 2,689,136 A | 9/1954 | Hendrickson | |
| 2,915,776 A | 12/1959 | Hanson et al. | |
| 3,025,079 A | 3/1962 | Gouirand | |
| 3,669,467 A | 3/1972 | Dunlap et al. | |
| 3,737,174 A | 6/1973 | Hickman | |
| 4,310,171 A | 1/1982 | Merkle | |
| 4,310,717 A | 1/1982 | Eastman et al. | |
| 4,485,521 A | 12/1984 | Welsch et al. | |
| 4,559,669 A | 12/1985 | Bonzer et al. | |
| 4,903,545 A | 2/1990 | Louis et al. | |
| 5,156,576 A | 10/1992 | Johnson | |
| 5,400,469 A | 3/1995 | Simonsen | |
| 5,542,494 A | 8/1996 | Louis et al. | |
| 5,899,470 A | 5/1999 | Heitzmann | |
| 5,979,920 A | 11/1999 | Krakowiak et al. | |
| 6,026,920 A | 2/2000 | Obeda et al. | |
| 6,170,242 B1 | 1/2001 | Gordon | |
| 6,460,318 B1 | 10/2002 | Ferris et al. | |
| 6,644,425 B1 | 11/2003 | Hauser | |
| 6,732,828 B1 | 5/2004 | Abend et al. | |
| 6,845,837 B2 | 1/2005 | Ohashi et al. | |

(Continued)

OTHER PUBLICATIONS

"Hydro-Gear EZT (ZT-2200) Transmission" available at <https://www.youtube.com/watch?v=sdR7kGvRU10>, Feb. 5, 2013.

(Continued)

*Primary Examiner* — Alicia Torres
*Assistant Examiner* — Matthew Ian Neal
(74) *Attorney, Agent, or Firm* — Bracewell LLP; Christopher L. Drymalla

(57) ABSTRACT

A mower system that includes a stand-on rider platform system that includes a folding rider platform pivotally coupled to the mower frame and a folding rider platform suspension system that includes a resilient member adapted to engage with the folding rider platform while the folding rider platform is in a folded-down position. The stand-on rider platform system can also include a rider presence sensor adapted to engage with the folding rider platform while the folding rider platform is in the folded-down position.

21 Claims, 13 Drawing Sheets

(56) References Cited

U.S. PATENT DOCUMENTS

| | | | |
|---|---|---|---|
| 6,848,937 B1 | 2/2005 | Hsiao | |
| 6,857,254 B2 | 2/2005 | Melone et al. | |
| 7,127,889 B1 | 10/2006 | Bennett et al. | |
| 7,363,759 B2 | 4/2008 | Ohashi et al. | |
| 7,455,114 B2 | 11/2008 | MacDougall | |
| 7,588,104 B2 | 9/2009 | Ohashi et al. | |
| 7,708,292 B2 | 5/2010 | Foster | |
| 8,141,886 B1* | 3/2012 | Sugden | A01D 34/82 280/32.5 |
| 8,262,104 B2 | 9/2012 | Kallevig et al. | |
| 8,561,382 B2* | 10/2013 | Gamble | A01D 34/64 56/14.7 |
| 8,733,478 B2 | 5/2014 | Chapman | |
| 9,161,490 B2 | 10/2015 | Melone et al. | |
| 9,723,781 B1 | 8/2017 | Covington | |
| 9,730,386 B1 | 8/2017 | Covington et al. | |
| 9,821,689 B2* | 11/2017 | Busboom | B60N 2/502 |
| 9,914,356 B2 | 3/2018 | Simon | |
| D830,419 S | 10/2018 | Covington et al. | |
| D830,420 S | 10/2018 | Covington et al. | |
| 10,188,033 B1 | 1/2019 | Covington et al. | |
| 10,349,577 B1 | 7/2019 | Covington et al. | |
| 10,356,978 B1 | 7/2019 | Covington et al. | |
| 2007/0029118 A1 | 2/2007 | Acharya et al. | |
| 2007/0284839 A1 | 12/2007 | Sasaoka | |
| 2009/0033054 A1 | 2/2009 | Foster | |
| 2009/0302562 A1* | 12/2009 | Kallevig | A01D 34/64 280/32.5 |
| 2011/0193309 A1 | 8/2011 | Nance | |
| 2011/0197419 A1 | 8/2011 | Melone et al. | |
| 2013/0074466 A1* | 3/2013 | Zwieg | A01D 69/03 56/14.7 |
| 2016/0152262 A1* | 6/2016 | Laurin | A01D 34/82 56/11.8 |
| 2018/0229570 A1 | 8/2018 | Fay, II et al. | |
| 2018/0249630 A1 | 9/2018 | Mullet et al. | |
| 2019/0141889 A1* | 5/2019 | Fisher | B60K 17/28 56/10.7 |
| 2020/0062321 A1* | 2/2020 | Redinger | A01D 34/82 |
| 2020/0344946 A1* | 11/2020 | Bryant | B62D 51/02 |
| 2020/0352098 A1* | 11/2020 | Fujii | B62D 51/02 |

OTHER PUBLICATIONS

"Hydro-Gear ZT-3400 Product Presentation (english)" available at <https://www.youtube.com/watch?v=stZh8uQRh1A>, Feb. 6, 2012.
Bad Boy Mowers "AOS Diesel Model Mower Owner's & Parts Manual" 2010 Edition; pp. 1-40.
Bad Boy Mowers "AOS Model Mower Owner's & Parts Manual" 2010 Edition; pp. 1-40.
Bad Boy Mowers "Bad Boy AOS Part Manual: 35hp Vanguard; 27hp Kawasaki" 2007; pp. 1-31.
Bad Boy Mowers "Bad Boy Diesel Part Manual: 35hp Caterpillar Diesel; 28hp Caterpillar Diesel" 2007; pp. 1-30.
Bad Boy Mowers "Bad Boy Parts Manual for Pup and Lightning Models: 23hp Vanguard; 26hp Kawasaki; 30hp Kohler; 32hp Vanguard" 2007; pp. 1-30.
Bad Boy Mowers "Compact Diesel Model Mower Owner's & Parts Manual" 2010 Edition; pp. 1-36.
Bad Boy Mowers "Diesel AOS & Compact Zero-Turn Mower Owner's, Service & Parts Manual" 2011; pp. 1-56.
Bad Boy Mowers "Diesel Compact Diesel Models Zero-Turn Mower Owner's, Service & Parts Manual" 2012; pp. 1-52; see pp. 33 and 35.
Bad Boy Mowers "Lightning & Pup Zero-Turn Mower Owner's, Service & Parts Manual" 2011; pp. 1-56.
Bad Boy Mowers "Outlaw Stand-On Model Zero-Turn Mower Owner's, Service & Parts Manual"; 2017; pp. 1-58.
Bad Boy Mowers "Outlaw XP Models Zero-Turn Mower Owner's, Service & Parts Manual" 2012; pp. 1-44; see pp. 29-30.
Bad Boy Mowers "Parts Manual for Bad Boy AOS Models: 35hp Vanguard; 27hp Kawasaki" 2008; pp. 1-29.
Bad Boy Mowers "Parts Manual for Bad Boy AOS Models: 35hp Vanguard; 27hp Kawasaki" 2009; pp. 1-28.
Bad Boy Mowers "Parts Manual for Bad Boy Diesel Models: 35hp Caterpillar; 28hp Caterpillar" 2008; pp. 1-28.
Bad Boy Mowers "Parts Manual for Bad Boy Diesel Models: 35hp Caterpillar; 28hp Caterpillar" 2009; pp. 1-27.
Bad Boy Mowers "Parts Manual for Bad Boy Pup and Lightning Models: 23hp Vanguard; 30hp Kohler; 26hp Kawasaki; 32hp Vanguard; 31hp Kawasaki" 2008; pp. 1-36.
Bad Boy Mowers "Parts Manual for Bad Boy Pup and Lightning Models: 23hp Vanguard; 30hp Kohler; 26hp Kawasaki; 32hp Vanguard; 31hp Kawasaki" 2009; pp. 1-33.
Bad Boy Mowers "Pup or Lightning Model Mower Owner's & Parts Manual" 2010 Edition; pp. 1-48.
Bad Boy Mowers "Revolt Stand on Zero-Turn Mower Owner's, Service & Parts Manual"; 2019; pp. 1-52.
Exmark Manufacturing Company, Inc.; "Starts E-Series" brochure; 2019; pp. 1-2.
Exmark Master Parts Viewer; "Model: STE600GKA44300 Year: 2019 Serial Range: 404314159-406294344" available as of Jun. 6, 2019 at: https://lookup3.toro.com/partdex/exmark/index.cfm?xCaller=exmark%26adv=y; p. 1.
Hydro-Gear; "ZT-2800/ZT-3100/ZT-3400 Integrated Zero-Turn Transaxle Service and Repair Manual" BLN-52441, Jan. 2013; pp. 1-52.
Parker; "Integrated Hydrostatic Transmissions HTE, HTJ and HTG Series" Oct. 2015; pp. 1-6.

\* cited by examiner

STAND-ON MOWER FOLDING PLATFORM SYSTEM

FIELD

Embodiments relate generally to mowing devices and more particularly to riding mower operator support systems.

BACKGROUND

A lawn mower (or "mower") is often used to cut (or "mow") grassy areas. A mower typically utilizes one or more rotating cutting blades that cut grass as the mower travels across the ground. A mower often takes the form of a walk-behind mower or a riding mower (or "ride-on" mower). A walk-behind mower is typically designed to be operated by an operator that walks behind and guides the mower. Some walk-behind mowers rely on the operator pushing the mower for propulsion (often referred to as "push" mowers). Some walk-behind mowers have a drive system (or "propulsion" system) that assist in propelling the mower (often referred to as "self-propelled" walk-behind mowers). A riding mower is typically designed to be operated by an operator that rides on the mower as it travels across the ground and cuts grass. A riding mower normally includes an operator support, such as a seat or platform, and a drive system that propels the mower.

A zero-turn-radius (ZTR) riding mower is a particular type of riding mower. A ZTR riding mower is often identifiable by right and left control handles (or "control arms") that an operator can push or pull to drive respective right and left drive wheels forward or backward. This enables the mower to make sharp turns with ease, even spinning the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate drive wheels forward or backward in response to pushing or pulling of the control handles.

ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform. An operator may prefer a sit-on ZTR mower over a stand-on ZTR mower, for example, for the comfort provided by mowing in a seated position. An operator may prefer a stand-on ZTR mower over a sit-on ZTR mower, for example, for its compact footprint, easy on-and-off access, and the visual perspective provided in the standing position.

SUMMARY

Although stand-on zero-turn-radius (ZTR) riding mowers can provide advantages over other types of mowers, platform of stand-on ZTR mowers often have shortcomings. For example, the platform may be fixed in a riding position (e.g., with the platform extending in a generally horizontal orientation). This may increase the overall length and footprint of the mower. Moreover, the fixed nature of the platform may transmit jarring of the mower to the operator. This may reduce comfort and lead to operator fatigue. In some instances, stand-on ZTR mowers have folding platforms that can be moved between a riding position (e.g., with the platform "folded-down" such that it extends in a generally horizontal orientation) and a transport position (e.g., with the platform "folded-up" into a generally vertical orientation). A folding platform can introduce additional issues and challenges. For example, a folding platform may be susceptible to movement as the mower travels over uneven terrain. Moreover, it can be difficult to sense when an operator is or is not present on the platform. This can be important for activating safety systems, such as those operable to inhibit the cutting system when an operator is not present on the platform.

In view of these and other shortcomings, provided are embodiments of a stand-on ZTR mower operator (or "rider") platform system. In some embodiments, the platform system includes a folding (or "fold-up") rider platform system having a suspension system. In some embodiments, the rider platform suspension system includes a resilient member adapted to dampen movement of the platform. The resilient member may be disposed between a nose of the folding platform and a platform support weldment of the mower. Compression of the resilient member between the folding platform and the platform support weldment may dampen movement of the platform. This may inhibit the transmission of vibrations and jarring of the mower to the platform and the operator. In some embodiments, the suspension system is adjustable. For example, the position of the resilient member may be adjustable to provide for "tuning" the amount of dampening provided by the resilient member. In some embodiments, an operator presence sensor is provided to sense presence of an operator occupying the folding platform. For example, an operator presence sensor may be biased and positioned such that the operator presence sensor is engaged by the lip of the platform while an operator stands on the platform and the operator presence sensor is disengaged while an operator is not standing on the platform.

Provided in some embodiments, is stand-on riding mower system that includes the following: a mower motor; a mower frame; a mower deck housing mowing blades; and a stand-on rider platform system adapted to support an operator in a standing position. The stand-on rider platform system including: a folding rider platform pivotally coupled to the mower frame (where the folding rider platform is adapted to pivot about a platform pivot axis between a folded-up position and a folded-down position, and the folding rider platform is adapted to support an operator in the standing position while the folding rider platform is in the folded-down position; a folding rider platform support member); and a folding rider platform suspension system including a resilient member disposed between the folding rider platform and the folding rider platform support member (where the resilient member is adapted to engage with the folding rider platform while the folding rider platform is in the folded-down position to dampen movement of the folding rider platform in the folded-down position).

In some embodiments, the folding rider platform includes a planar base plate adapted to support feet of the operator in the standing position, where the folded-up position includes the planar base plate disposed in a vertical orientation, and where the folded-down position includes the planar base plate disposed in a horizontal orientation. In some embodiments, the platform pivot axis is offset above a plane of the planar base plate. In some embodiments, the planar base plate includes a nose adapted to engage with the resilient member, and the nose includes a planar lip angled relative to the planar base plate. In some embodiments, the resilient member is secured to the folding rider platform support member. In some embodiments, a position of the resilient member is adjustable. In some embodiments, the system further includes a second resilient member disposed between the folding rider platform and the folding rider platform support member, where the second resilient member is adapted to engage with the folding rider platform while the folding rider platform is in the folded-down position to dampen movement of the folding rider platform in the folded-down position. In some embodiments, the system further includes a rider presence sensor adapted to engage with the folding rider platform while the folding rider platform is in the folded-down position. In some embodiments, the rider presence sensor is secured to the folding rider platform support member and includes a plunger adapted to engage with the folding rider platform.

Provided in some embodiments, is mower system that includes the following: a mower motor; a mower frame; a mower deck housing mowing blades; and a stand-on rider platform system including: a folding rider platform pivotally coupled to the mower frame (where the folding rider platform is adapted to pivot between a folded-up position and a folded-down position, the folding rider platform adapted to support an operator while the folding rider platform is in the folded-down position); and a folding rider platform suspension system including a resilient member adapted to engage with the folding rider platform while the folding rider platform is in the folded-down position.

In some embodiments, the folding rider platform includes a planar base plate adapted to support feet of the operator in the standing position, and where the folded-down position includes the planar base plate disposed in a horizontal orientation. In some embodiments, the platform is adapted to pivot about a platform pivot axis, and where the platform pivot axis is offset from the plane of the planar base plate. In some embodiments, the planar base plate includes a nose adapted to engage with the resilient member, and the nose includes a planar lip angled relative to the planar base plate. In some embodiments, the resilient member is secured to a frame member of the mower system. In some embodiments, a position of the resilient member is adjustable. In some embodiments, the system further includes a second resilient member adapted to engage with the folding rider platform while the folding rider platform is in the folded-down position. In some embodiments, the system further includes a rider presence sensor adapted to engage with the folding rider platform while the folding rider platform is in the folded-down position, where the rider presence sensor is adapted to sense a presence of an operator standing on the folding rider platform. In some embodiments, the rider presence sensor is secured to a frame member of the mower system and includes a plunger adapted to engage with the folding rider platform.

Provided in some embodiments, is mower system that includes the following: a mower motor; a mower frame; a mower deck housing mowing blades; and a stand-on rider platform system including: a folding rider platform pivotally coupled to the mower frame (where the folding rider platform is adapted to pivot between a folded-up position and a folded-down position, the folding rider platform adapted to support an operator while the folding rider platform is in the folded-down position); and a rider presence sensor adapted to engage with the folding rider platform while the folding rider platform is in the folded-down position (the rider presence sensor adapted to sense a presence of an operator standing on the folding rider platform).

In some embodiments, the folding rider platform includes a planar base plate adapted to support feet of the operator in the standing position and the folded-down position includes the planar base plate disposed in a horizontal orientation. In some embodiments, the planar base plate includes a nose adapted to engage with the rider presence sensor and the nose includes a planar lip angled relative to the planar base plate. In some embodiments, the rider presence sensor includes a plunger adapted to engage with the folding rider platform. In some embodiments, the rider presence sensor is secured to a frame member of the mower system. In some embodiments, the system further includes a resilient member adapted to engage with the folding rider platform while the folding rider platform is in the folded-down position.

Figure 1:
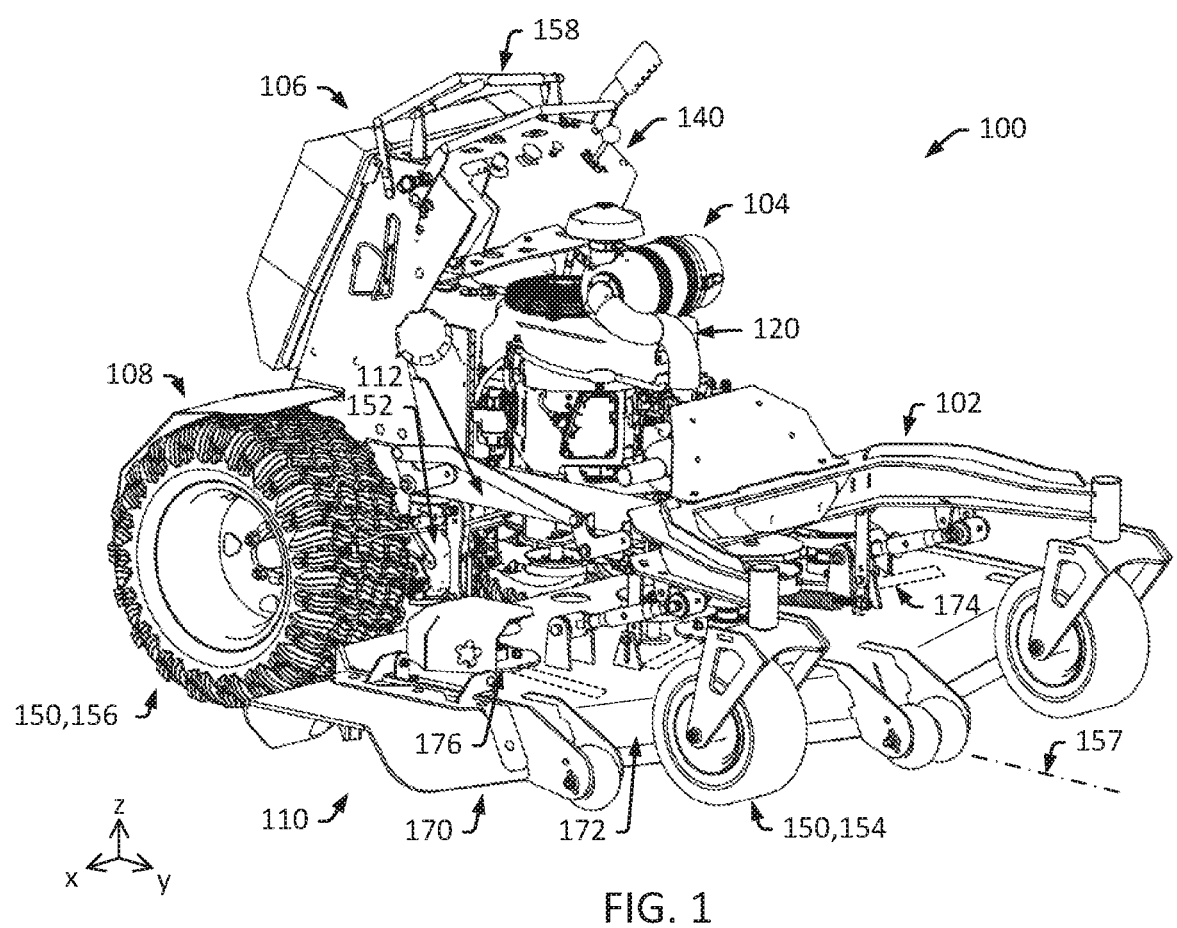
FIGS. 1-2B are diagrams that illustrates a mower system in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Figure 2A:
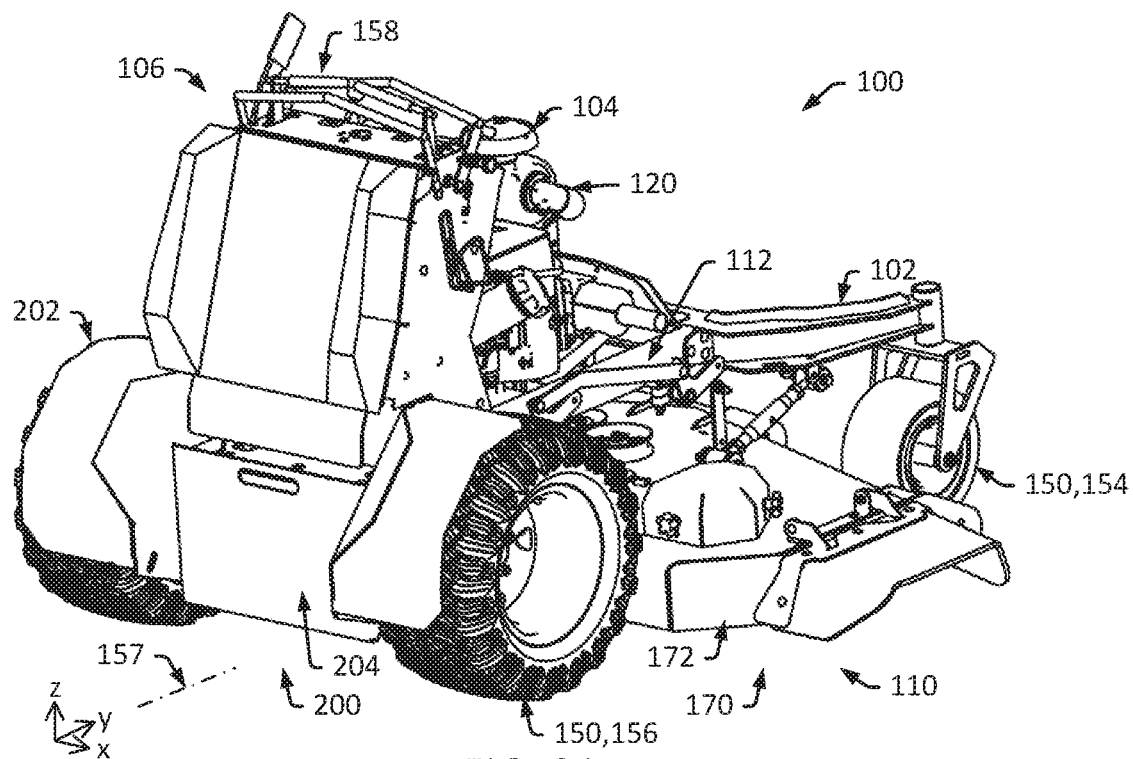
Figure 2B:
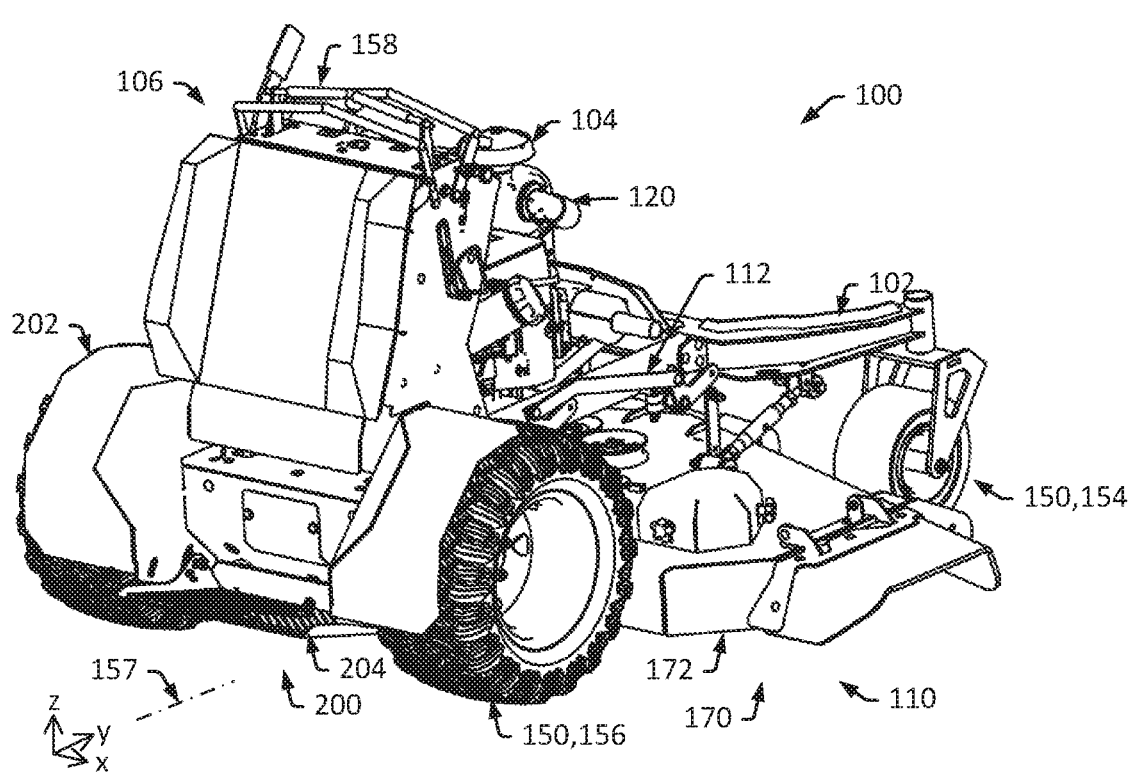

Described are embodiments of a riding mower system having a folding (or "fold-up") platform system that incorporates a platform suspension system and rider presence sensing system. In some embodiments, the rider platform suspension system includes a resilient member adapted to dampen movement of the platform. The resilient member may be disposed between a nose of the folding platform and a platform support weldment of the mower. Compression of the resilient member between the folding platform and the platform support weldment may dampen movement of the platform. This may inhibit the transmission of vibrations and jarring of the mower to the platform and the operator. In some embodiments, the suspension system is adjustable. For example, the position of the resilient member may be adjustable to provide for "tuning" the amount of dampening provided by the resilient member. In some embodiments, an operator presence sensor is provided to sense presence of an operator occupying the folding platform. For example, an operator presence sensor may be biased and positioned such that the operator presence sensor is engaged by the lip of the platform while an operator stands on the platform and the operator presence sensor is disengaged while an operator is not standing on the platform FIGS. 1 and 2A-2B are diagrams that illustrates a mower system (or "mower") 100 in accordance with one or more embodiments. In some embodiments, the mower 100 is a stand-on zero-turn-radius (ZTR) riding mower that includes, a frame system ("frame") 102, a power system 104, a control system 106, a drive system 108, and a cutting system 110.

In some embodiments, the frame system 102 is a rigid structure that supports components of the mower 100. For example, the frame system (or "frame") 102 may include members that are rigidly fastened to one another such that they do not move relative to one another. In some embodiments, the frame 102 includes a frame weldment 112. The frame weldment 112 may include a rigid metal structure formed of multiple metal members that are welded, or similarly fastened, together. Other components of the mower 100 may be coupled to the frame 102 to position them relative to the frame 102 and to one another.

In some embodiments, the power system 104 includes a motor 120. The motor 120 may supply motive power used to operate the mower 100. In some embodiments, the motor 120 includes an engine, such as an internal combustion engine (e.g., a gas-fueled engine, a diesel-fueled engine, or a natural gas-fueled engine) or an electric motor. In some embodiments, the motor 120 is coupled to the frame 102. For example, the motor 120 may be bolted, or similarly fastened, to the frame weldment 112. In some embodiments, the power generated by the motor 120 rotates (or "drives") a drive shaft of the motor 120, which can be used as motive power for other components of the mower 100. For example, the power generated by the motor 120 may drive rotation of the drive shaft, which drives circulation of drive belts that transmit motive power from the drive shaft to the drive system 108 and the cutting system 110.

In some embodiments, one or more drive pulleys are coupled to the drive shaft. The drive pulleys may include, for example, a pump drive pulley and a deck drive pulley coupled to the drive shaft of the motor 120. In some embodiments, the drive pulleys engage with respective drive belts that are employed to transmit motive power to other components of the mower 100. For example, the pump drive pulley may engage with a pump drive belt (or "pump belt") that is circulated to transmit motive power to the drive system 108. The deck drive pulley may engage with a deck drive belt (or "deck belt") that is circulated to transmit motive power to the cutting system 110. During operation of the mower 100, the motor 120 may be operated to rotate the drive shaft, the pump drive pulley and the deck drive pulley, which, in turn, drives circulation of the pump drive belt and circulation of the deck drive belt.

In some embodiments, the deck drive pulley is part of a clutched pulley system (or "clutched pulley"). A clutched pulley may include a pulley and a pulley clutch mechanism (or "pulley clutch") that can be engaged or disengaged to regulate the transfer of torque to the pulley. This may provide for selective engagement and disengagement of the pulley, as well as belts and systems driven by the pulley. For example, a pulley clutch may be provided between the drive shaft and the deck drive pulley and may be engaged or disengaged to facilitate or inhibit, respectively, the transfer the rotational torque of the drive shaft to the deck drive pulley and the deck drive belt. This may provide for selective engagement and disengagement of the deck drive belt and the cutting system 110.

In some embodiments, the control system 106 includes controls 140 for regulating operation of the mower 100. For example, the control system 106 may include an ignition switch (e.g., a switch operable to start or stop operation of the motor 120), a throttle control (e.g., a knob operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck), or a user interface (e.g., a display of status information for the mower 100, such as hours and oil level). An operator may interact with the control system 106 to operate the mower 100 or to monitor various aspects of the operation of the mower 100.

In some embodiments, the drive system (or "propulsion system") 108 includes components for propelling (or "driving") the mower 100 across the ground. In some embodiments, the drive system 108 includes wheels 150 and one or more drive units 152 that supply motive power to the wheels 150. For example, the drive system 108 may include right and left forward wheels ("front wheels") 154 and right and left rear wheels ("back wheels") 156, and right and left drive units 152 operable to drive rotation of the right and left rear wheels 156, respectively.

For reference, the right and left sides of the mower 100 may be defined relative to the position of an operator facing forward (the direction in which an operator is expected to be primarily facing) while operating the mower 100. Accordingly, "forward" or "front" may refer to the direction that an operator is expected to be primarily facing while operating the mower 100. In accordance with the coordinate system axes provided in the figures, "right" may refer to the positive "x" direction, "left" may refer to the negative "x" direction, "front" or "forward" may refer to the positive "y" direction, and "back" or "backward" may refer to the negative "y" direction. A longitudinal axis 157 of the mower 100 may be oriented in the "y" direction, at or near a midpoint between the rear wheels 156 of the mower 100.

The front wheels 154 may be positioned at or near a front end of the frame system 102 to support a front portion of the mower 100. In some embodiments, the front wheels 154 are caster wheels that swivel about a vertically oriented rotational axis (e.g., a rotational axis oriented in the y-direction) in response to corresponding movements of the mower 100. The front wheels 154 may be referred to as "non-driven" wheels in that they do not receive motive power intended to propel the mower 100. The rear wheels 156 may be positioned at or near a rear end of the frame system 102 to support a rear portion of the mower 100. In some embodiments, the drive units 152 drive rotation of the rear wheels 156 to propel the mower 100. For example, each of the right and left rear wheels 156 may be coupled to a drive axle of the right and left drive units 152, respectively, and each of the drive units 152 may be selectively operable to rotate its drive axle and the attached wheel forward or backward (e.g., about a rotational axis oriented in the x-direction). The rear wheels 156 may be referred to as "driven" or "drive" wheels in that they receive (and are driven into rotation by) motive power intended to propel the mower 100.

In some embodiments, each of the drive units 152 is a hydraulic drive unit. For example, each of the drive units 152 may be an integrated hydrostatic (or "hydraulic") transaxle (also referred to as an "integrated transaxle" or "transaxle"). A transaxle may include a hydraulic pump, a hydraulic motor, and a drive axle integrated together in a single unit. In some embodiments, the drive units 152 transmit motive power to rotate an attached wheel in response to selective operation of associated control handles (or "levers") 158. For example, when a control handle 158 of a drive unit 152 is pushed forward or backward the drive axle of the drive unit 152 and the attached rear wheel 156 may be rotated forward or backward, respectively. An operator of the mower 100 may simultaneously push both of the right and left control handles 158 about the same distance forward to drive the mower 100 forward or may vary the distance of the control handles 158 to turn the mower 100.

In some embodiments, the cutting system 110 includes components that provide for cutting (or "mowing") of grass.

In some embodiments, the cutting system 110 includes a mowing deck system (or "deck system") 170. The mowing deck system 170 may include a mowing deck (or "deck") 172 that houses one or more cutting blades (or "blades") 174. During operation of the mower 100, the blades 174 may be rotated to cut (or "mow") grass under the deck 172 as the mower 100 traverses the ground. The deck 172 may be a metal housing that shields the operator and components of the mower 100 from debris, such as flying grass, dust or rocks that is generated by the rotating blades 174. In some embodiments, the mowing blades 174 are coupled to respective spindle assemblies (or "spindles") 176 which are coupled to the deck 172. Each of the spindles 176 may include a spindle housing, a spindle shaft and a spindle pulley. A blade 174 may be coupled (e.g., bolted or similarly fastened) to a lower end of the spindle shaft that terminates under the deck 172 such that the blade 174 is suspended under the deck 172. Rotation of the spindle pulley may cause a corresponding rotation of the spindle shaft and the blade 174. The spindle pulley may be rotated, for example, by circulation of the deck drive belt. In some embodiments, the cutting system 110 includes multiple blades 174 and associated spindles 176. For example, the deck system 170 may include a first, second and third (left, center and right) blades 174 coupled to first, second and third (left, center and right) spindles 176, respectively.

In some embodiments, the frame system 102 includes an operator ("rider") platform system ("platform system") 200 (see, e.g., FIGS. 2A-10B). The platform system 200 may include a platform support system ("support system") 202 and a folding platform ("platform") 204. FIGS. 4A, 5A, 6A, 7A, 8A, 9A and 10A are diagrams that illustrate side, side-cross-sectioned, back, front, bottom, top, and rear-system views of the rider platform system 200 having the platform 204 disposed in a "folded-down" (or "down" or "riding") position in accordance with one or more embodiments. FIGS. 4B, 5B, 6B, 7B, 8B, 9B and 10B are diagrams that illustrate side, side-cross-sectioned, back, front, bottom, top, and rear-system views of the platform system 200 having the platform 204 disposed in a "folded-up" (or "up" or "transport") position in accordance with one or more embodiments.

In some embodiments, the platform support system 202 includes frame elements that support the platform 204. For example, the platform support system 202 may include a platform support cross member ("cross member") 210, a left fender 212, and a right fender 214. In some embodiments, the platform support system 202 is rigidly secured to the other portions of the frame 102. For example, the cross member 210, the left fender 212, and the right fender 214 may be bolted (e.g., by way of bolts 215 of FIG. 3A) or similarly fastened to the frame weldment 112.

In some embodiments, the platform 204 is pivotally secured to the platform support system 202. For example, the platform 204 is pivotally secured to the platform support system 202 such that it can be moved between a riding position (e.g., where the platform is "folded-down" such that a base plate 220 of the platform 204 extends in a generally horizontal orientation) (see, e.g., FIGS. 4A, 5A, 6A, 7A, 8A, 9A and 10A) and a transport position (e.g., where the platform is "folded-up" such that a base plate 220 of the platform 204 extends in a generally horizontal orientation) (see, e.g., FIGS. 4B, 5B, 6B, 7B, 8B, 9B and 10B). In some embodiments, the platform 204 is pivotally secured to the platform support system 202 by way of pivot pins 230 (e.g., bolts). For example, the platform 204 may be pivotally secured to the platform support system 202 by way of a left pivot pin 230a and a right pivot pin 230b. The left pivot pin 230a may extend through a left lip 231a of the platform 204 and couple to a corresponding hole 232a in a vertically oriented side plate 234a of the left fender 212. The right pivot pin 230b may extend through a right lip 231b of the platform 204 and couple to a corresponding hole 232b in a vertically oriented side plate 234b of the right fender 214. The pivot pins 230 may define a platform pivot axis 240. The platform pivot axis 240 may be oriented transverse the longitudinal axis 157 of the mower 100. For example, the platform pivot axis 240 may be oriented horizontally, parallel to the "x-axis" or the rotational axis of the rear wheels 156. The platform pivot axis 240 may be oriented parallel to the plane of the base plate 220.

In some embodiments, the platform 204 includes guide pins 250 (e.g., bolts) that guide the pivoting movement of the platform 204. For example, the platform 204 may include a left guide pin 250a that engages a corresponding left guide slot 252a formed in the side plate 234a of the left fender 212 and a right guide pin 250b that engages a corresponding right guide slot 252b formed in the side plate 234b of the right fender 214. The left and right guide slots 252a and 252b may each include an arc shaped slot 254 having a depression 256 located at an upper end of the arc shaped slot 254. During use, the platform 204 may be folded up or down such that the left and right guide pins 250a and 250b travel up or down along the arc shaped slots 254 of the left and right guide slots 252a and 252b. While the platform 204 is in the down position, the left and right guide pins 250a and 250b may engage (or "rest on") a bottom end of the respective arc shaped slots 254 of the left and right guide slots 252a and 252b. While the platform 204 is in the up position, the left and right guide pins 250a and 250b may engage (or "rest in") the depression 256 of the respective arc shaped slots 254 of the left and right guide slots 252a and 252b, which may retain the platform 204 in the up position. To release the platform 204, an operator may simply pull up on the platform 204 (e.g., using handle cutout 260) to move the left and right guide pins 250a and 250b out of the respective depressions 256 and into the arc potions of the slots 254 and then simply lower the platform 204 such that it pivots downward into the down position. To stow the platform 204, an operator may simply pull up on the platform 204 (e.g., using handle cutout 260) to move the left and right guide pins 250a and 250b up the arc potions of the respective slots 254 and into the respective depressions 256, which capture the respective guide pins 250a and 250b to secure the platform 204 in the up position.

In some embodiments, the platform 204 defines a generally flat supporting surface (or "standing surface") on which an operator can stand while operating the mower 100. For example, the base plate 220 of the platform 204 may include a rigid flat plate (e.g., formed of steel). When the platform 204 is folded into the down position, the base plate 220 may be disposed in a generally horizontal orientation (e.g., parallel to the "x-y" plane) such that an operator can stand on and be supported by a horizontally orientated top surface 270 of the base plate 220. The base plate 220 may, for example, have a width 272 in the range of about 16 inches (in)-24 in (see, e.g., FIG. 3B). For example, the width 272 may be about 20 in. The base plate 220 may, for example, have a length 274 in the range of about 8 in-24 in. For example, the length 274 may be about 13.4 in (see, e.g., FIG. 3B). In some embodiments, a mat 276 (e.g., a rubber mat) may be disposed on the top surface 270 of the base plate 220. The mat 276 may, for example, extend across some or all of the top surface 270 to provide enhanced traction or cushioning for the operator standing on the platform 204.

In some embodiments, the platform 204 includes sides. For example, the platform 204 may include sides (or "lips") 231, including the left lip 231*a* extending from a left edge of the base plate 220 and the right lip 231*b* extending from a right edge of the base plate 220. The left and right lips 231*a* and 231*b* may be planar members extending from respective right and left edges of the base plate 220. When the platform 204 is viewed from behind while in the down position, the side lips 231 may extend "upward" in a vertical plane that is transverse to the plane of the base plate 220. The side lips 231 may help to center the operators feet on the top surface 270 of the base plate 220 and inhibit the operators feet from moving laterally (or "sideways") off of the top surface 270 of the base plate 220. For example, an operator may position his/her feet such that the outside of the operator's footwear abuts the side lips 231. This may provide a solid footing that helps the operator maintain balance as the mower 100 traverses the ground.

In some embodiments, the side lips 231 include guide pin holes 280 and pivot pin slots 282. For example, the left and right side lips 231*a* and 231*b* may include left and right guide pin holes 280*a* and 280*b* and left and right pivot pin slots 282*a* and 282*b*. The left and right guide pins 250*a* and 250*b* may be disposed in the left and right guide pin holes 280*a* and 280*b*, respectively. The left and right pivot pins 230*a* and 230*b* may extend through the left and right pivot pin slots 282*a* and 282*b*, respectively. The left and right pivot pin slots 282*a* and 282*b* may be oriented parallel to the base plate 220 to enable the platform 204 to move up and down while oriented vertically, such that the guide pins 250 can be moved in and out of the depressions 256 of the guide slots 252.

In some embodiments, the pivot pin slots 282 are sized to accommodate the pivot pins 230. The pivot pins 230 may have a diameter in the range of about 0.188 in-1.0 in. For example, the pivot pins 230 may have a diameter of about 0.625 in. The pivot pin slots 282 may have a slot length 290 in the range of about 1 in-3 in (see, e.g., FIG. 5A). For example, the slot length 290 may be about 1.4 in. The pivot pin slots 282 may have a slot height 292 in the range of about 0.2 in-1.1 in. For example, the slot height 292 may be about 0.65 in.

Figure 5A:
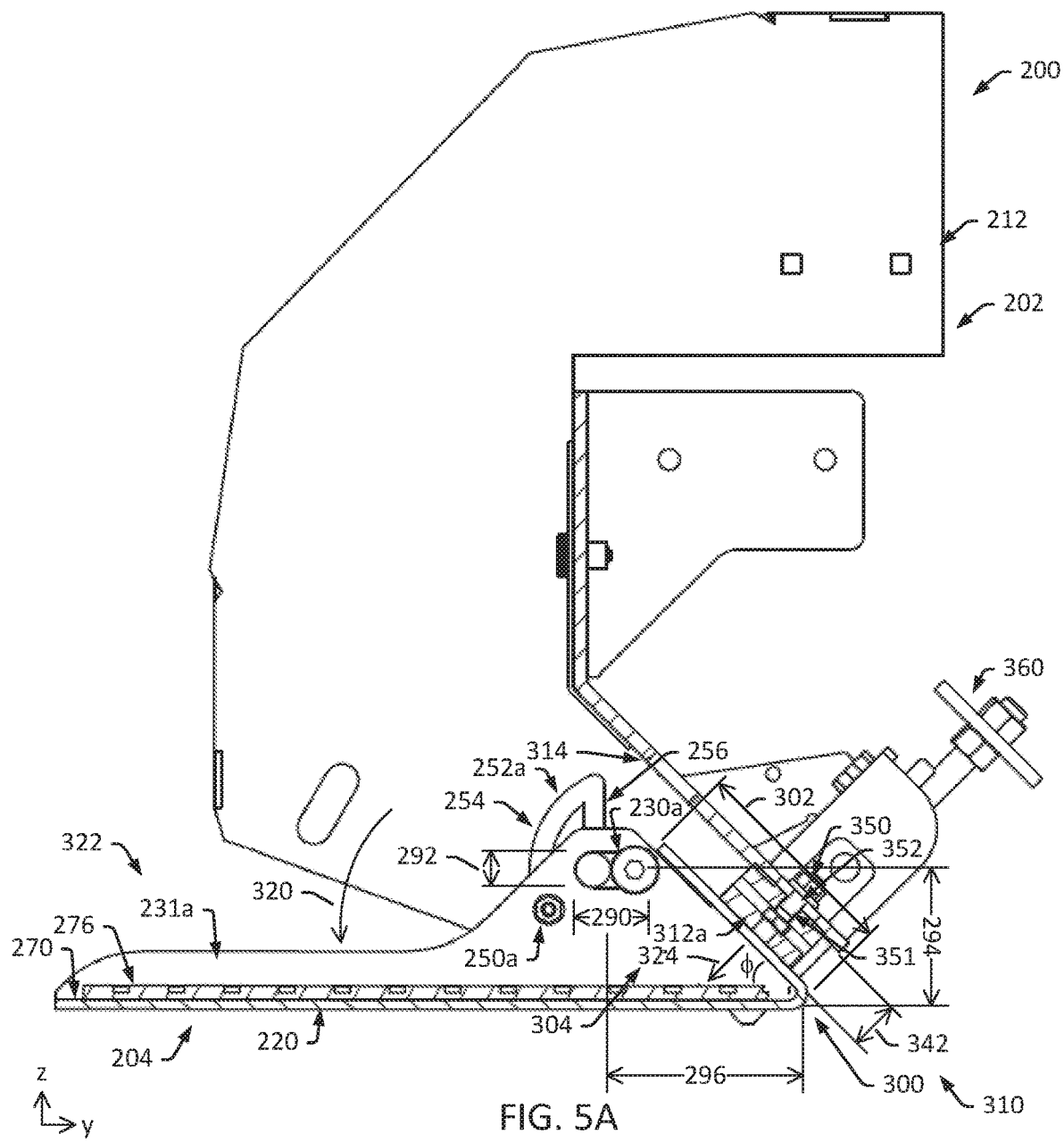

In some embodiments, the pivot pin slots 282 are vertically offset from the top surface 270 of the base plate 220 by a vertical offset distance 294 (see, e.g., FIG. 5A). As a result, the pivot pins 230 and the corresponding platform pivot axis 240 may be offset from the top surface 270 of the base plate 220 by the vertical offset distance 294. The vertical offset distance 294 may be in the range of about 1 in-5 in. For example, the vertical offset distance 294 may be about 2.53 in.

In some embodiments, the pivot pin slots 282 are horizontally offset from a front (or "nose" or "front lip") of the base plate 220 by a horizontal offset distance 296 (see, e.g., FIG. 5A). As a result, the pivot pins 230 and 230 and the corresponding platform pivot axis 240 may be offset from the front (or "nose") of the base plate 220 by a horizontal offset distance 296. The horizontal offset distance 296 may be in the range of about 2 in-5 in. For example, the vertical offset distance 296 may be about 3.47 in.

In some embodiments, the platform 204 includes a front side ("nose" or "front lip") 300. For example, the platform 204 may include a front side ("nose" or "front lip") 300 that includes a planar member extending from a front edge of the base plate 220. When the platform 204 is viewed from the side in the down position (see, e.g., FIG. 5A), the nose 300 may include a planar member that extends "upward" at an angle ($\phi$) relative to the plane of the base plate 220. The angle ($\phi$) may be in the range of about 30 degrees-90 degrees. For example, the angle ($\phi$) may be about 45 degrees. The nose may have a length 302 in the range of about 0.75 in-1.0 in. For example, the length 302 may be about 0.825 in.

The nose 300 may define a cavity 304 into which an operator can place the tow portion of their footwear while standing on the base plate 220 (see, e.g., FIG. 5A). The nose 300 may inhibit the operator's feet from moving longitudinally (or "forward") off of the front of the base plate 220. During operation, an operator may position his/her feet such that the operator's footwear extends into the cavity 304 (forward of the platform pivot axis 240). This may facilitate the operator standing at (or at least relatively closer to) the center of the mower 100 and the rotational axes of the rear wheels 156, which can help the operator maintain balance as the mower 100 traverses the ground. As described, in some embodiments, the nose 300 may define a member that abuts a resilient member (e.g., the resilient members 312 described here) that provides for dampening of movement of the platform 204. This may include reducing the transmission of vibrations or jarring of the mower 100 from the frame 102 to the platform 204 and the operator, or reduce "bouncing" of the platform 204 and the operator as the mower traverses bumpy or un-level ground.

Figure 3A:
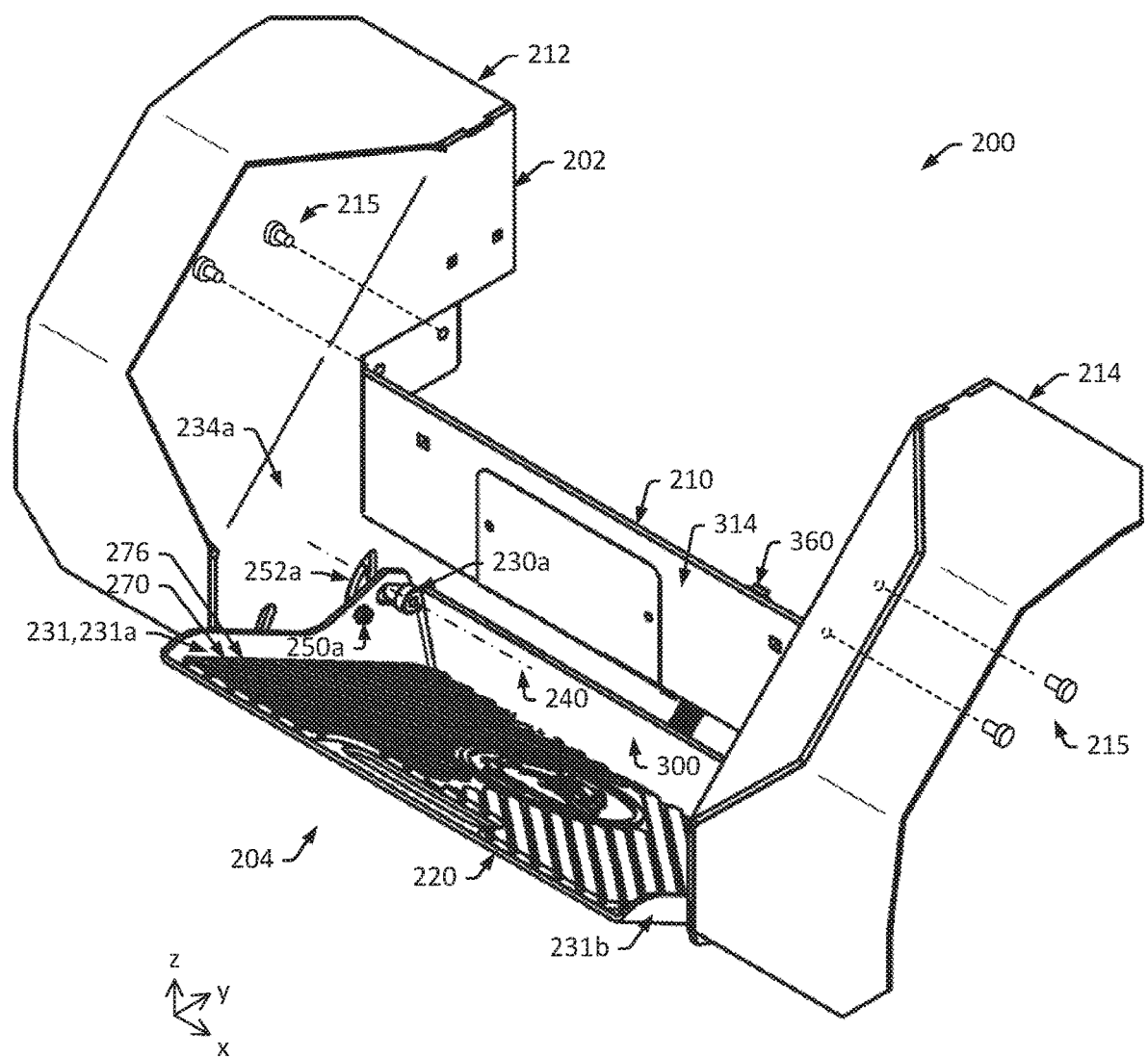
FIGS. 3A-9B are diagrams that illustrate various views of a platform system in accordance with one or more embodiments.
Figure 3B:
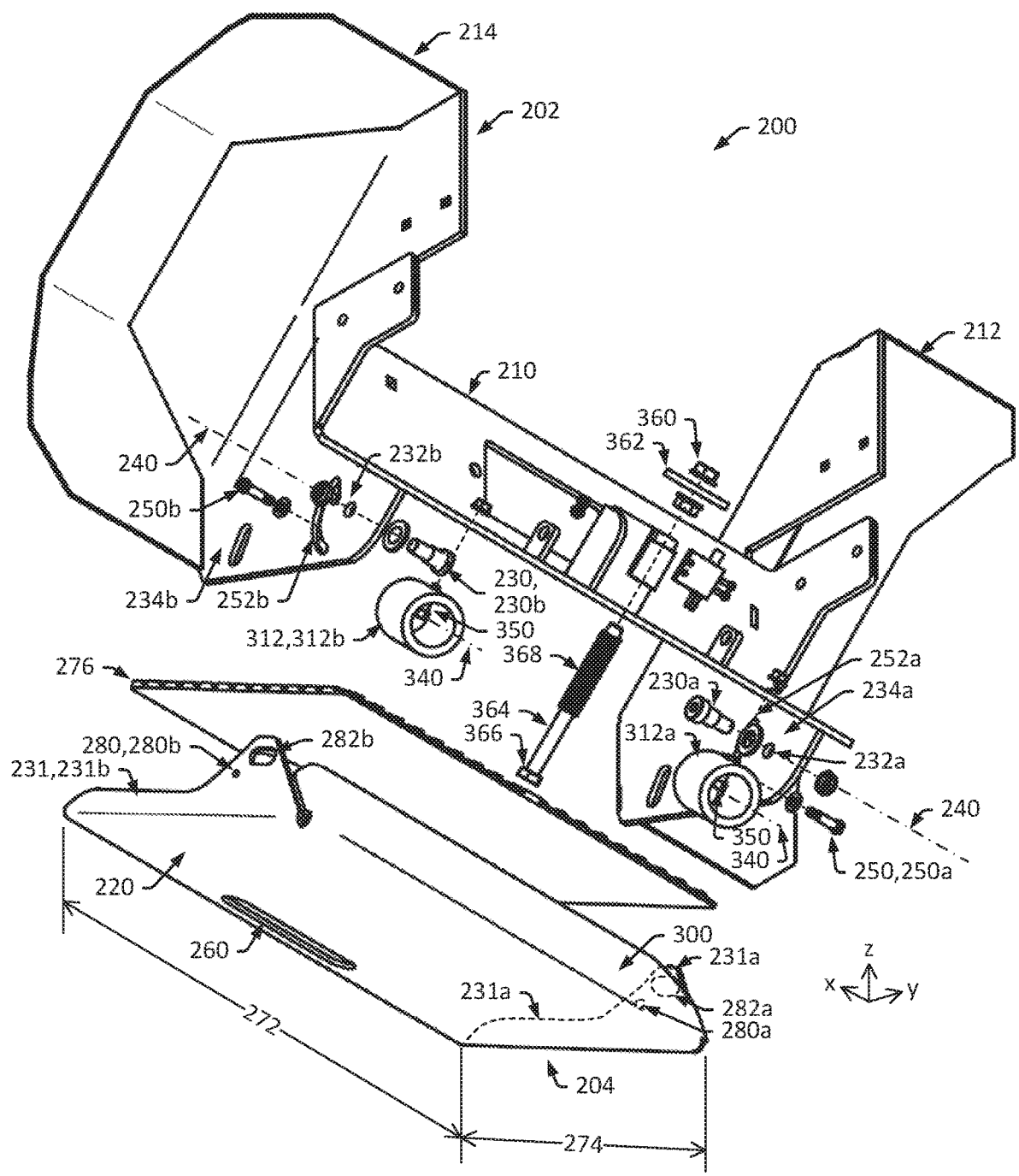
Figure 4A:
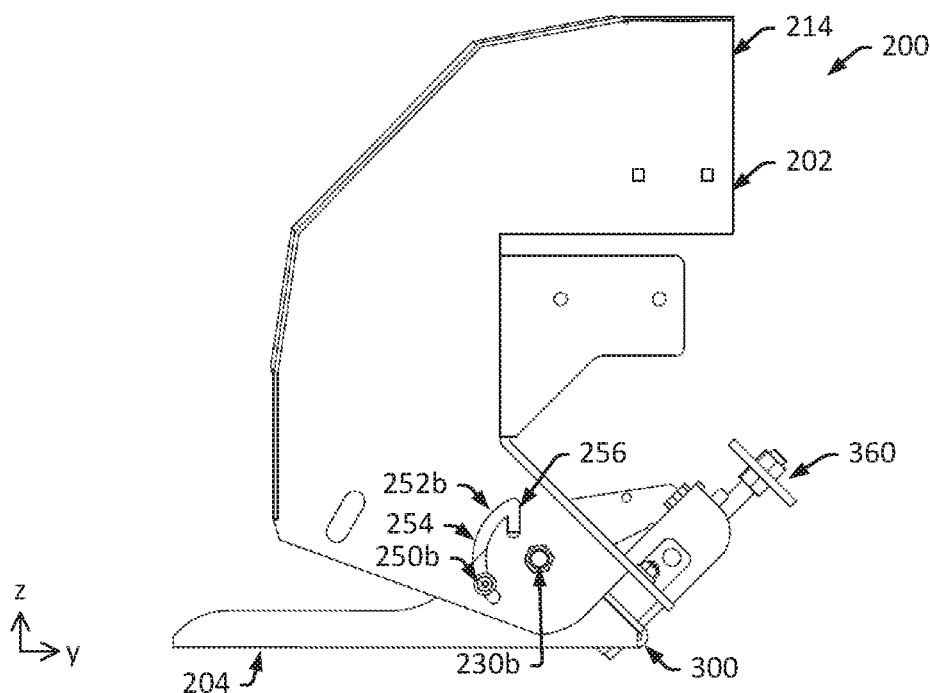
Figure 4B:
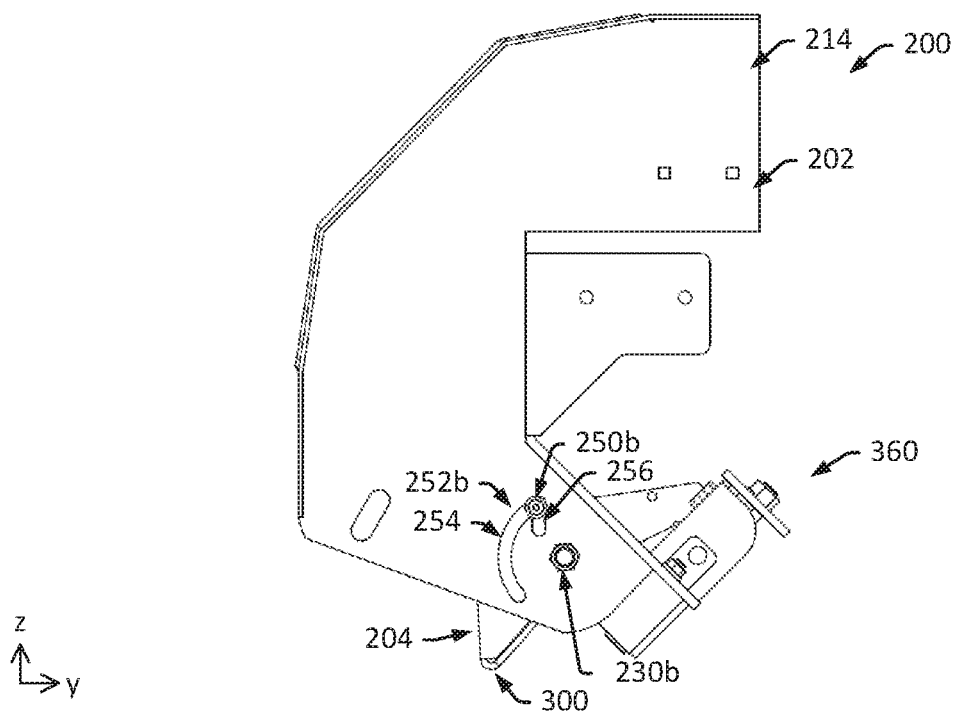
Figure 5B:
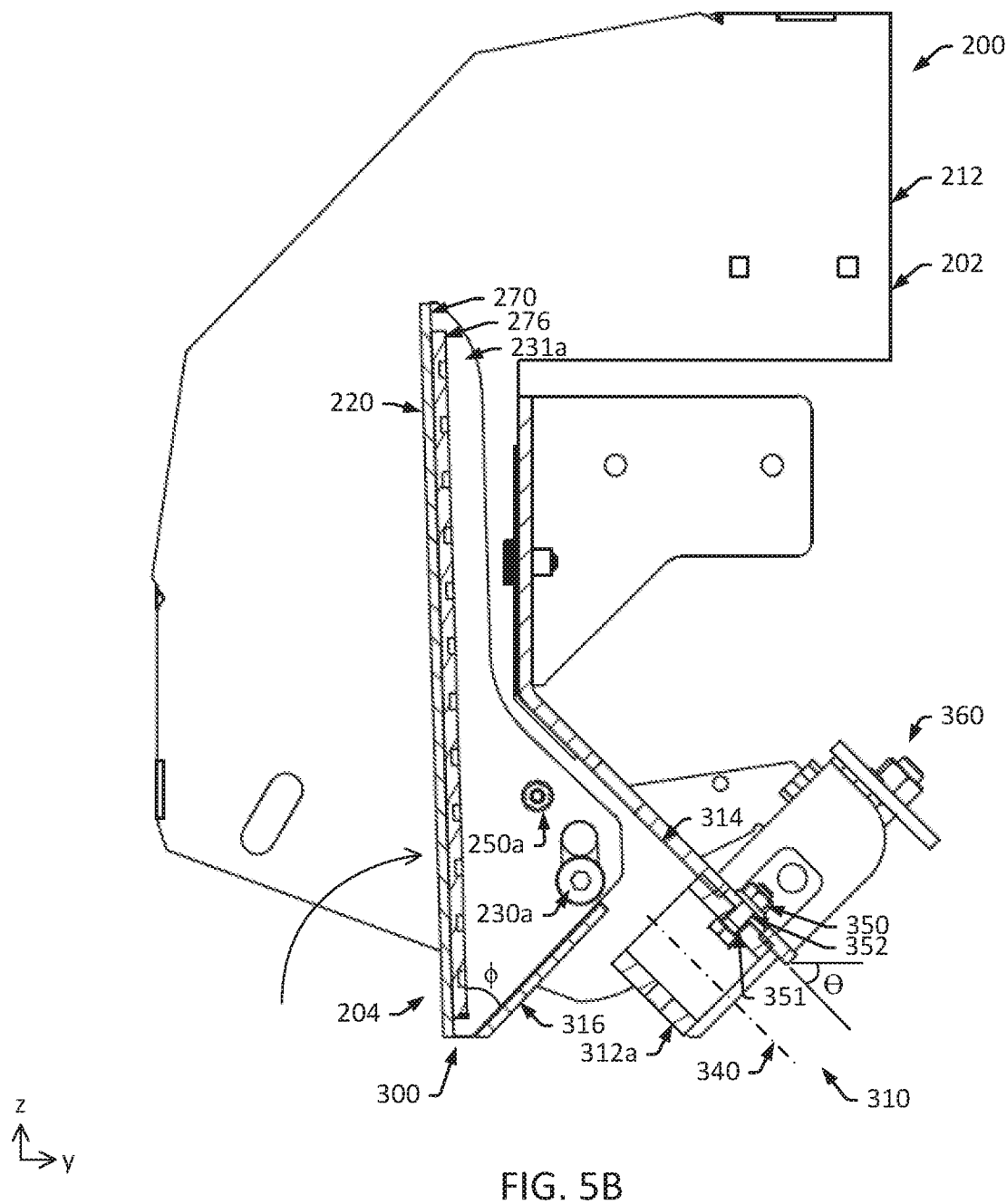
Figure 6A:
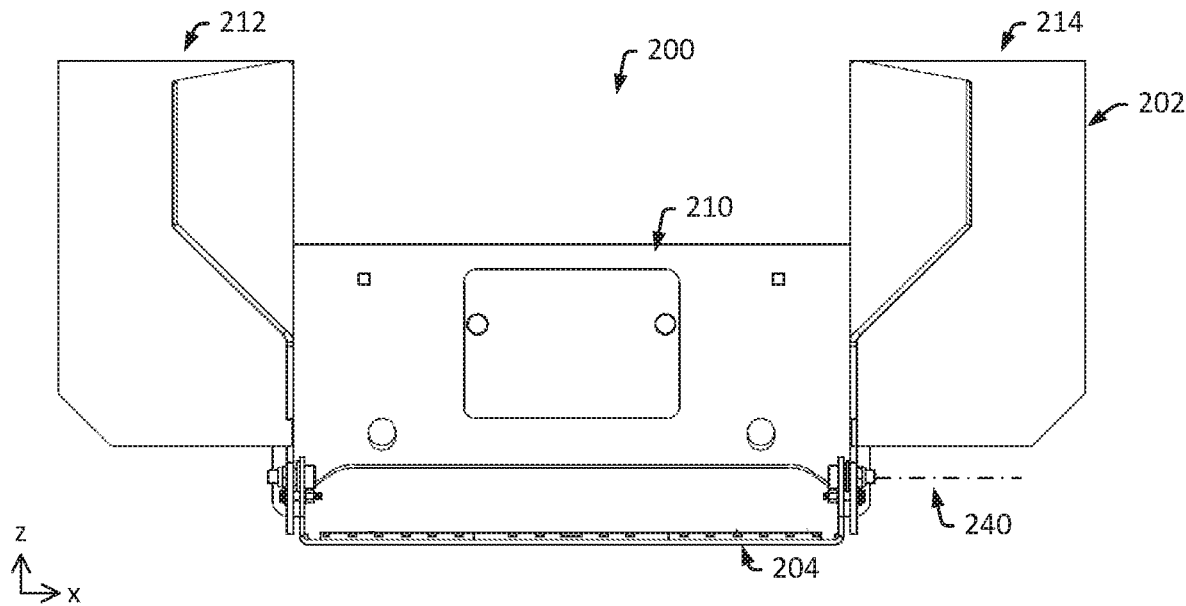
Figure 6B:
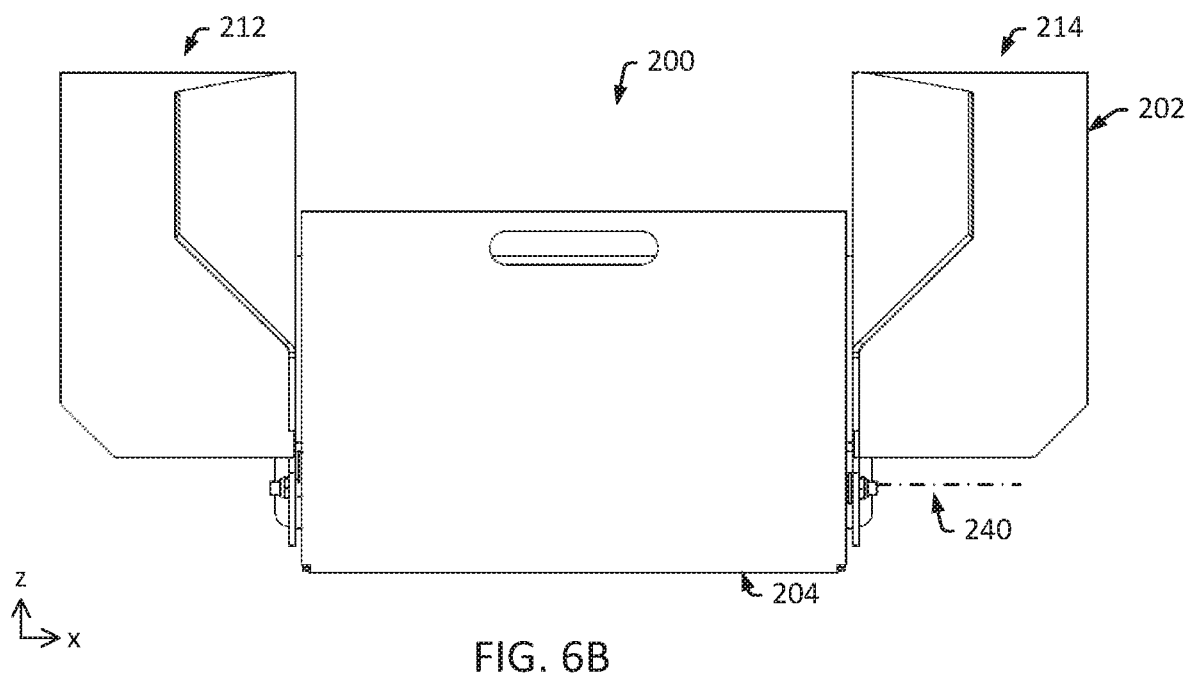
Figure 7A:
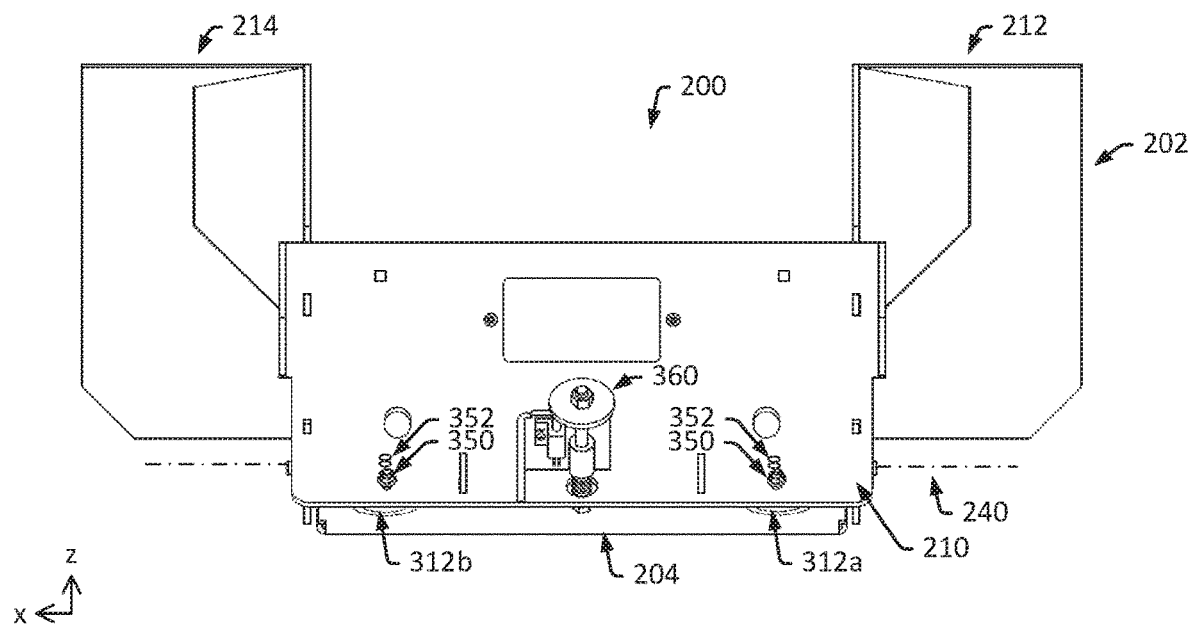
Figure 7B:
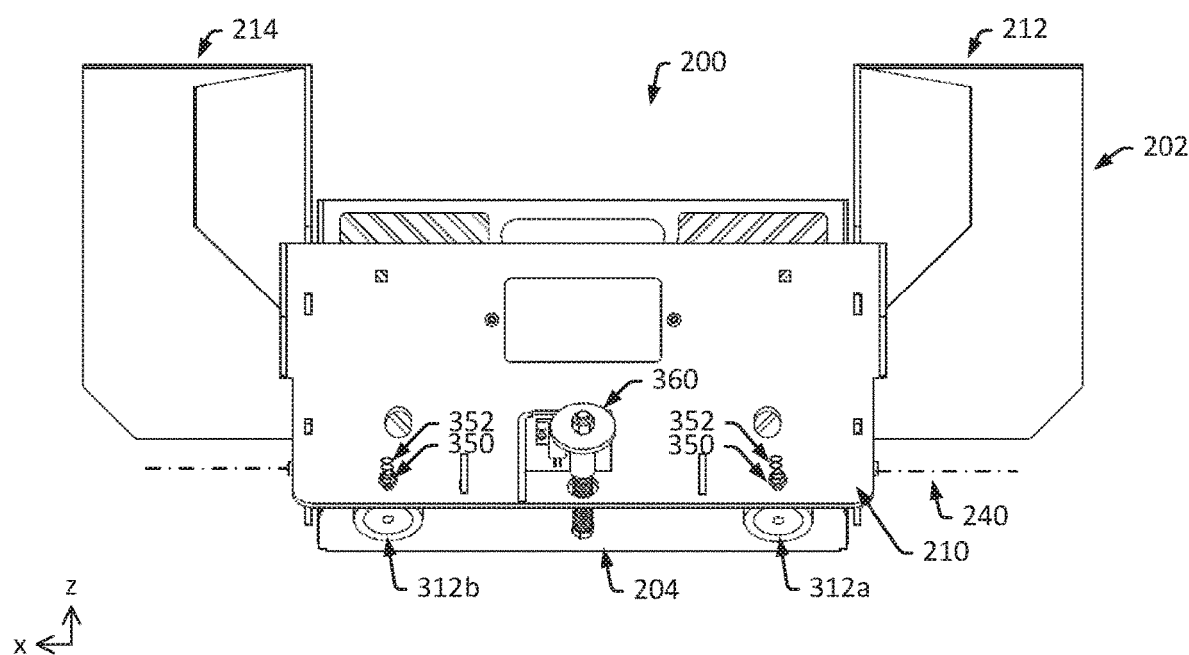
Figure 8A:
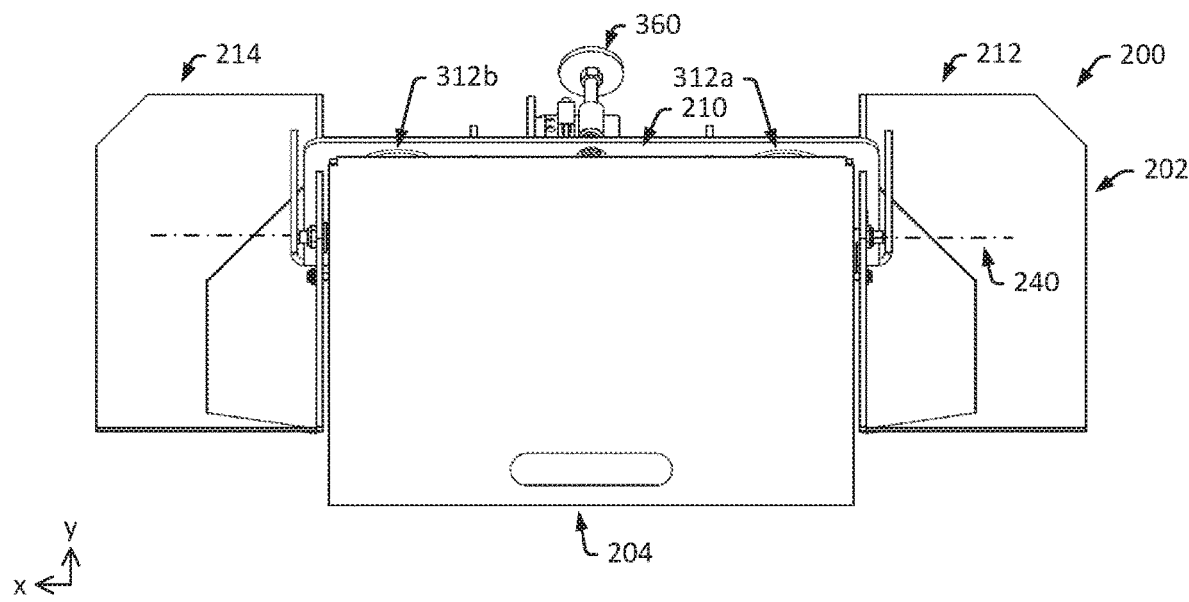
Figure 8B:
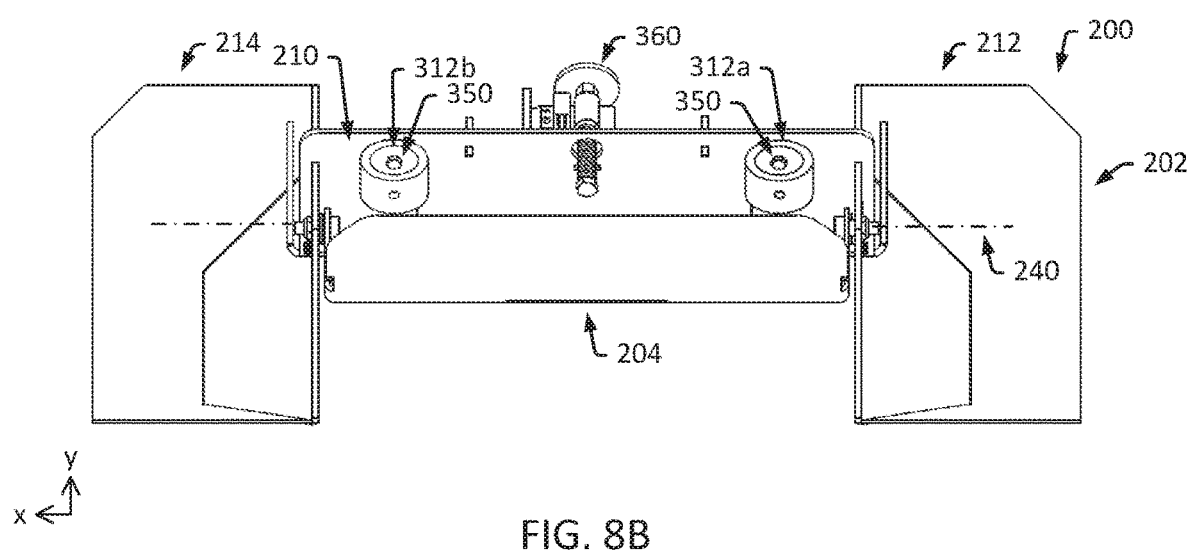
Figure 9A:
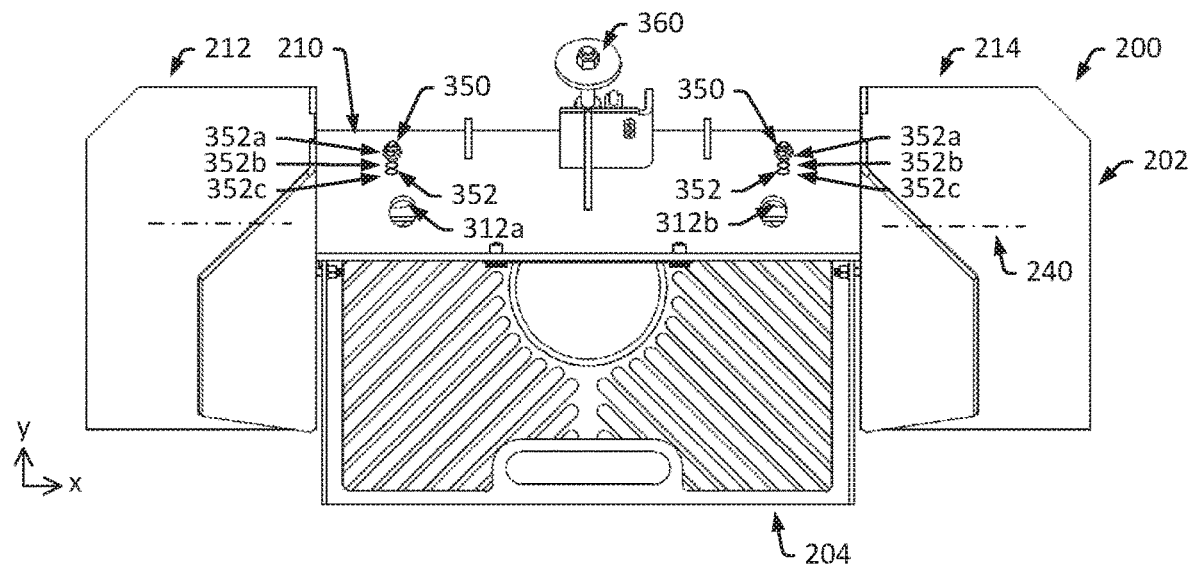
Figure 9B:
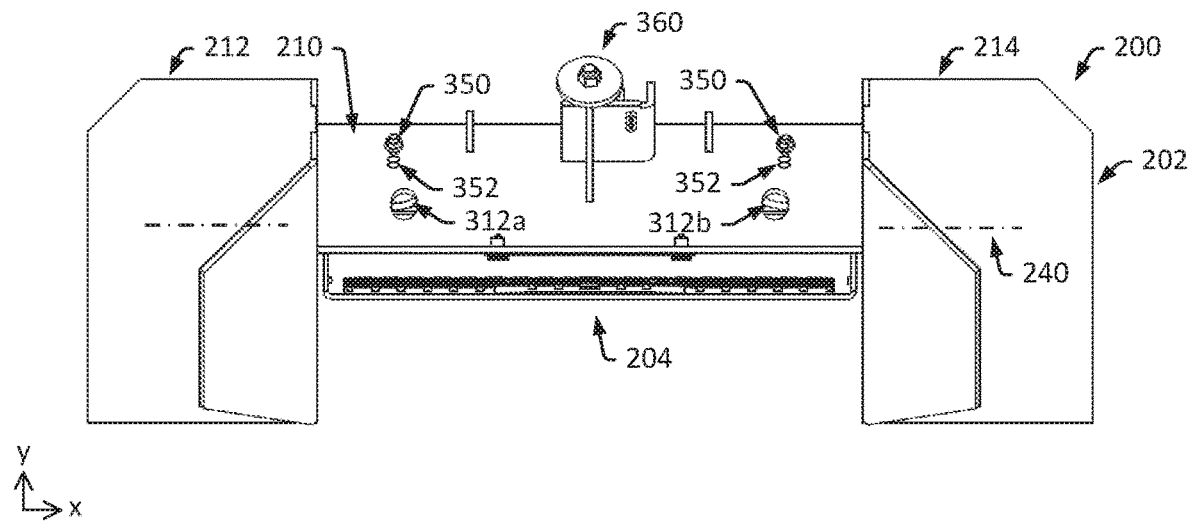
Figure 10A:
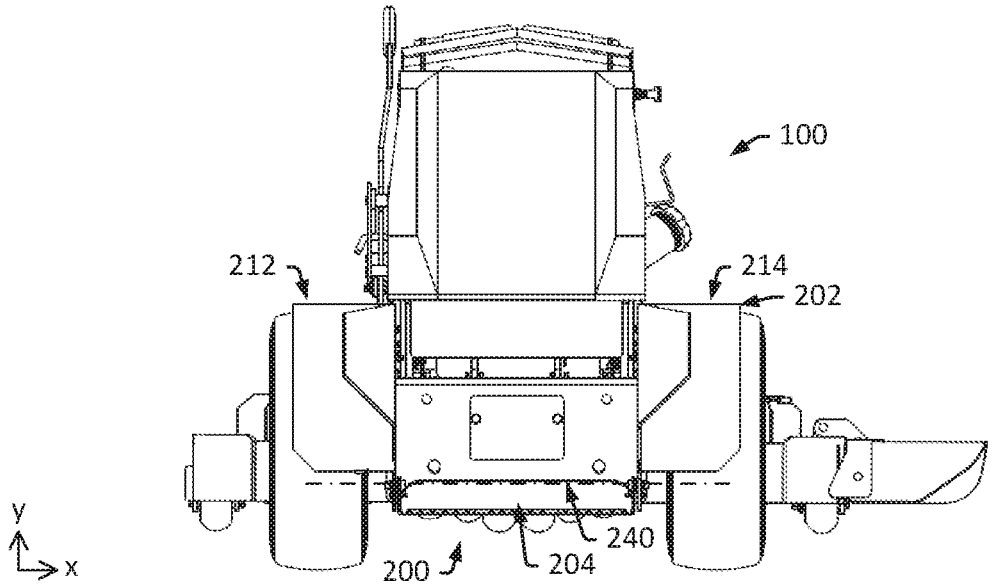
FIGS. 10A and 10B are diagrams that illustrate various views of a platform system on a mower system in accordance with one or more embodiments.
Figure 10B:
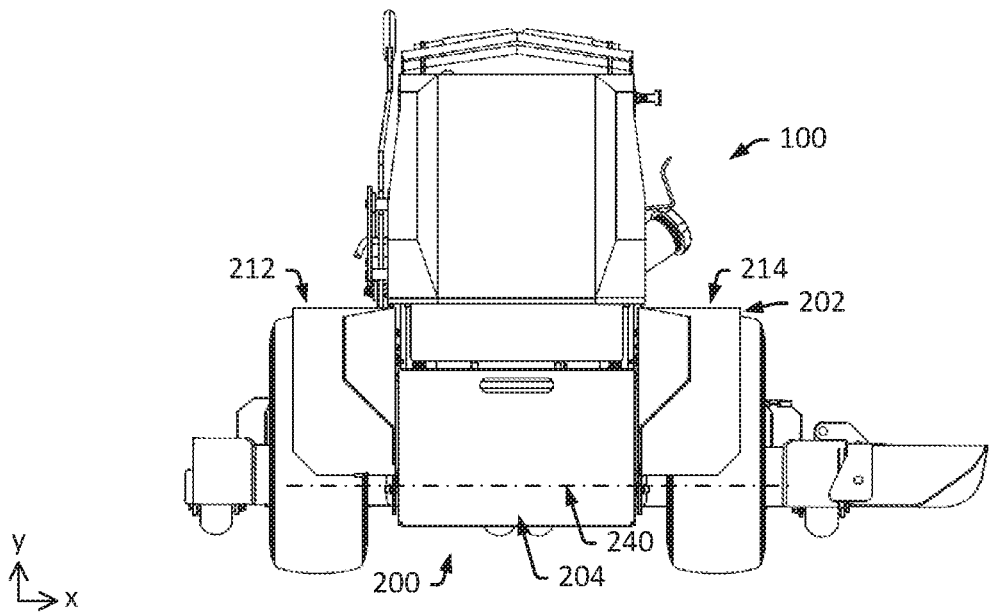

In some embodiments, the platform system 200 includes a platform suspension system ("suspension system") 310 (see, e.g., FIGS. 3B, 5A and 5B). The suspension system 310 may include one or more resilient members 312. The resilient members 312 may dampen movement of the platform 204. For example, the suspension system 310 may include a left resilient member 312*a* and a right resilient member 312*b* that are positioned to be disposed between the nose 300 of the platform 204 and the cross member 210 of the support system, with the platform 204 in the down position (see, e.g., FIGS. 3B, 5A, 5B, 7A, 8A, and 9A). The resilient members 312 may dampen downward movement of the platform 204. For example, referring to FIG. 5A, while an operator is standing on the platform 204 in a folded-down position, the weight of the operator on a back portion of the base plate 220 of the platform 204 (e.g., the weight acting on the portion of the top surface 270 of base plate 220 behind the platform pivot axis 240) may create a counterclockwise torque about the platform pivot axis 240 that urges the platform to rotate counterclockwise (as illustrated by arrow 320) such that a back end 322 of the platform 204 moves downward (e.g., toward a surface supporting the wheels 150 of the mower 100), and a face 316 of the nose 300 of the platform 204 moves upward toward a face 314 of the cross member 210. In such an instance, the resilient members 312 may be "sandwiched" and compressed between the face 316 of the nose 300 of the platform 204 and the face 314 of the cross member 210 and provide a biasing force (as illustrated by arrow 324) that resist the upward movement of the nose 300 toward the face 314 of the cross member 210. The biasing force may increase as the face 316 of the nose 300 of the platform 204 moves closer to the face 314 of the cross member 210 due to the resilient members 312 being further compressed. Accordingly, the resilient members 312 may inhibit and dampen the "downward" pivoting of the platform 204. This may inhibit vibrations and jarring of the mower system 100 being transferred to the platform 204 and an operator standing on the platform 204 or reduce "bouncing" of the platform 204 and the operator as the mower traverses bumpy or un-level ground, which can, in turn, enhance operator comfort and control.

In some embodiments, the resilient members 312 are formed of a resilient material. For example, the resilient members 312 may be formed of an elastomer, such as rubber or another elastic polymer. When a force is exerted against the resilient member 312, it may deform until it generates a biasing force that is sufficient to counteract the force exerted. After the force is removed, the resilient member 312 may return to its shape with little to no deformation.

In some embodiments, the resilient members 312 are hollow cylindrical members. For example, each of the resilient members 312 may be hollow cylinders having a length in the range of about 1.0 in-2.5 in (e.g., a length of about 1.8 in), an outer diameter in the range of about 1.0 in-3.0 in (e.g., an outer diameter of about 2.5 in), and an inner diameter in the range of about 0.6 in-2.75 in (e.g., an inner diameter of about 1.58 in). In some embodiments, the resilient members 312 are hollow cylindrical members having a circular or elliptical cross-sectional profile. The resilient members 312 may act as a "bumper" that biases the platform 204 away from the cross member 210. In some embodiments, the resilient members 312 bias the platform 204 away from the cross member 210 such that the base plate 220 of the platform angles slightly upward relative to horizontal when an operator is not present on the platform 204 (see, e.g., FIG. 2B) and returns to (or close to) horizontal when an operator is present on the platform 204.

In some embodiments, the resilient members 312 are oriented parallel to the face 314 of the cross member 210. For example, the resilient members 312 may be secured to the cross member 210 such that the longitudinal axes 340 of the resilient members 312 are parallel to the face 314 of the cross member 210 (see, e.g., FIG. 5B). In some embodiments, the face 314 of the cross member 210 has angle relative to horizontal (θ) that is the same or similar to that of the angle (φ) of the nose 300 relative to the base plate 220 (see, e.g., FIG. 5B). The angle (θ) may be in the range of about 0 degrees-90 degrees. For example, the angle (θ) may be about 45 degrees. In some embodiments, an offset distance 342 between the face 314 of the cross member 210 and the face 316 of the nose (with the platform 204 folded down such that the base plate 220 of the platform 204 is generally horizontal) is in in the range of about 0.75 in-1.0 in (see, e.g., FIG. 5A). For example, the offset distance 342 may be about 0.825 in.

In some embodiments, the resilient members 312 are fastened to the cross member 210. For example, each of the resilient members 312 may be secured to the cross member 210 by way of a bolt (or similar fastener) 350 extending through the a hole 351 in the circumference (or "wall") of the resilient member 312 and a complementary hole 352 in the cross member 210 (see, e.g., FIG. 5B). In some embodiments, the position of the resilient members 312 is adjustable. For example, at the location for attachment of a resilient member 312 to the cross member 210, the cross member 210 may include a series of holes 352 extending vertically along the cross member 210 (e.g., a row of holes 352 parallel to the longitudinal axis 340 of the resilient member 312) (see, e.g., FIGS. 7A, 7B, 9A and 9B). The position of the resilient member 312 may be adjusted by positioning the bolt 350 in a different one of the holes 352. The adjustability of the resilient members 312 may enable corresponding adjustments in the amount of dampening provided by the resilient members 312. For example, a resilient member 312 may be moved from one of the holes 352 to a hole farther from the platform pivot axis 240 (e.g., from a middle one of the holes 352b to the lowest one of the holes 352a) to increase the torque on the platform 204 created by the biasing force created by compression of the resilient members 312 (see, e.g., FIG. 9A). In contrast, a resilient member 312 may be moved from one of the holes 352 to a hole closer to the platform pivot axis 240 (e.g., from a middle one of the holes 352b to the highest one of the holes 352c) to decrease the torque on the platform 204 created by the biasing force created by compression of the resilient members 312 (see, e.g., FIG. 9A).

Figure 11A:
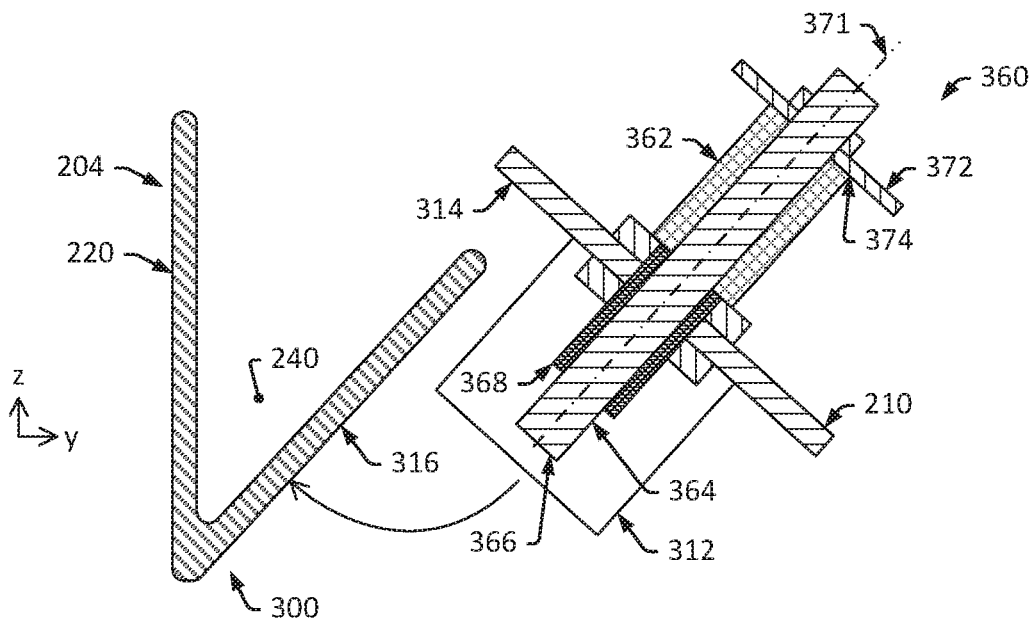
FIGS. 11A and 11B are diagrams that illustrate cross-sectioned views of a rider presence sensor system in accordance with one or more embodiments.
Figure 11B:
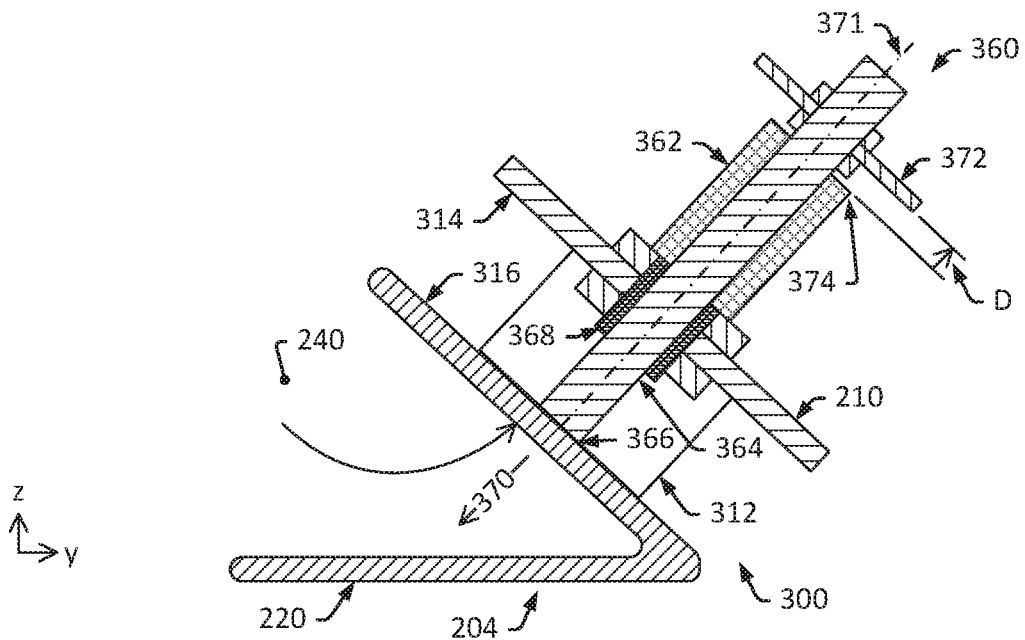

In some embodiments, the platform system 200 includes a rider presence sensing system ("presence sensing system") 360 (see, e.g., FIGS. 3B-5B, 7A-9B, and 11A and 11B). The presence sensing system 360 may include a system for sensing when an operator is standing on (or is otherwise present on) the platform 204. In some embodiments, the presence sensing system 360 includes a rider presence switch 362 that is engaged when an operator is standing on the platform 204 and is disengaged when an operator is not standing on the platform 204. For example, the presence sensing system 360 may include a rider presence switch 362 secured to the cross member 210 and having a plunger (or "stem") 364 having a distal end 366 that is positioned to be engaged by the face 316 of the nose 300 of the platform 204. Referring to FIGS. 11A and 11b, the rider presence switch 362 may include a spring 368 (or similar biasing member) that exerts a biasing force when compressed (as illustrated by arrow 370) to urge the plunger 364 into an extended position, with its distal end 366 located away from the face 314 of the of the cross member 210 such that is can engage the face 316 of the nose 300 of the platform 204 in the folded-down position. In some embodiments, a longitudinal axis 371 of the plunger 364 is oriented transverse to the plane of the cross member 210.

When the platform 204 is folded-up (see, e.g., FIGS. 4B, 5B, 6B, 7B, 8B, 9B, 10B and 11B), the face 316 of the nose 300 of the platform 204 may be located a sufficient distance from the face 314 of the of the cross member 210 such that the face 316 of the nose 300 of the platform 204 does not engage the distal end 366 of the plunger 364 of the rider presence switch 362. When the platform 204 is folded-down (e.g., without an operator standing on the platform 204) (see, e.g., FIGS. 4A, 5A, 6A, 7A, 8A, 9A, 10A and 11A), the face 316 of the nose 300 of the platform 204 may be located a sufficiently close to the face 314 of the of the cross member 210 such that the face 316 of the nose 300 of the platform 204 comes close to engaging (or does engage) the distal end 366 of the plunger 364 of the rider presence switch 362. Without an operator being present, the weight of the platform 204 may not be sufficient to overcome the biasing forces of the resilient member 312 and the spring 368. As a result, the plunger 364 may not move by an amount sufficient to change the state of the rider presence switch 362. For example, the plunger 364 may not move an amount sufficient to move a contact disc 372 (e.g., a metal washer coupled to a proximal end of the plunger 364) out of contact with a corresponding contact point 374). With an operator being present, the weight of the operator acting on the platform 204 and the weight of the platform 204 may be sufficient to overcome the biasing force of the resilient member 312 and the spring 368. As a result, the plunger 364 may move by an amount sufficient to change the state of the rider presence switch 362. For example, the plunger 364 may move along its longitudinal axis by a distance (D) to move the contact disc 372 out of contact with the corresponding contact point 374.

In some embodiments, while the rider presence switch 362 is active (e.g., the contact disc 372 is in contact with the corresponding contact point 374), the rider presence switch 362 may provide a signal to the control system 106 that is indicative of the platform 204 not being occupied by an operator. In response to this "unoccupied" signal, the control system 106 may inhibit one or more operations of the mower 100 that are reserved for times when an operator occupies the platform 204. For example, the control system 106 may inhibit the cutting system 110 (e.g., disable the pulley clutch to prevent the blades 174 from rotating while the platform 204 is not occupied by an operator). In some embodiments, while the rider presence switch 362 is not active ("deactivated") (e.g., the contact disc 372 is in not in contact with the corresponding contact point 374), the rider presence switch 362 may provide a signal to the control system 106 that is indicative of the platform 204 being occupied by an operator. In response to this "occupied" signal, the control system 106 may enable one or more operations of the mower 100 that are reserved for times when an operator occupies the platform 204. For example, the control system 106 may enable the cutting system 110 (e.g., enable the pulley clutch to enable the motor 120 to drive the blades 174 to rotate while the platform 204 is occupied by an operator).

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

As used throughout this application, the word "may" is used in a permissive sense (such as, meaning having the potential to), rather than the mandatory sense (such as, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A, B or C may refer to the element including A, B, C, A and B, A and C, B and C, or A, B and C. As used throughout this application, the term "from" does not limit the associated operation to being directly from. Thus, for example, receiving an item "from" an entity may include receiving an item directly from the entity or indirectly from the entity (e.g., by way of an intermediary entity).

What is claimed is:

1. A stand-on riding mower system, comprising:
a mower motor;
a mower frame;
a mower deck housing mowing blades; and
a stand-on rider platform system configured to support an operator in a standing position, the stand-on rider platform system comprising:
a folding rider platform pivotally coupled to the mower frame, wherein the folding rider platform is configured to pivot about a platform pivot axis between a folded-up position and a folded-down position, the folding rider platform configured to support an operator in the standing position while the folding rider platform is in the folded-down position;
a folding rider platform support member;
a rider presence sensor secured to the folding rider platform support member and configured to engage the folding rider platform while the folding rider platform is in the folded-down position; and
a folding rider platform suspension system comprising a resilient member disposed between the folding rider platform and the folding rider platform support member, wherein the resilient member is configured to engage with the folding rider platform while the folding rider platform is in the folded-down position to dampen movement of the folding rider platform in the folded-down position,
wherein the folding rider platform is configured to pivot about the platform pivot axis to compress the resilient member and engage the rider presence sensor, and
wherein the resilient member is configured to bias the folding rider platform such that (a) the rider presence sensor is in an activated state while the folding rider platform is in the folded-down position without an operator occupying the folding rider platform, and (b) the rider presence sensor is in a deactivated state while the folding rider platform is in the folded-down position with an operator occupying the folding rider platform, wherein the activated state is configured to inhibit an operation of the mower and the deactivated state is configured to enable the operation of the mower.

2. The system of claim 1, wherein the folding rider platform comprises a planar base plate configured to support feet of the operator in the standing position, wherein the folded-up position comprises the planar base plate disposed in a vertical orientation, and wherein the folded-down position comprises the planar base plate disposed in a horizontal orientation.

3. The system of claim 2, wherein the platform pivot axis is offset above a plane of the planar base plate.

4. The system of claim 2, wherein the planar base plate comprises a nose configured to engage with the resilient member and the rider presence sensor, and wherein the nose comprises a planar member angled relative to the planar base plate.

5. The system of claim 1, wherein the resilient member is secured to the folding rider platform support member.

6. The system of claim 1, wherein a position of the resilient member is adjustable.

7. The system of claim 1, further comprising a second resilient member disposed between the folding rider platform and the folding rider platform support member, wherein the second resilient member is configured to engage with the folding rider platform while the folding rider platform is in the folded-down position to dampen movement of the folding rider platform in the folded-down position.

8. The system of claim 1, wherein the rider presence sensor comprises a plunger configured to engage with the folding rider platform.

9. A mower system, comprising:
a mower motor;
a mower frame;
a mower deck housing mowing blades; and
a stand-on rider platform system comprising:
- a folding rider platform pivotally coupled to the mower frame, wherein the folding rider platform is configured to pivot between a folded-up position and a folded-down position, the folding rider platform configured to support an operator while the folding rider platform is in the folded-down position;
- a rider presence sensor secured to a frame member of the mower system and configured to engage with the folding rider platform while the folding rider platform is in the folded-down position, the rider presence sensor configured to sense a presence of an operator standing on the folding rider platform; and
- a folding rider platform suspension system comprising a resilient member configured to be compressed between the frame member and the folding rider platform while the folding rider platform is in the folded-down position,
wherein the folding rider platform is configured to pivot about a platform pivot axis to compress the resilient member and engage the rider presence sensor, and
wherein the resilient member is configured to bias the folding rider platform such that (a) the rider presence sensor is in an activated state while the folding rider platform is in the folded-down position without an operator occupying the folding rider platform, and (b) the rider presence sensor is in a deactivated state while the folding rider platform is in the folded-down position with an operator occupying the folding rider platform, wherein the activated state is configured to inhibit an operation of the mower and the deactivated state is configured to enable the operation of the mower.

10. The system of claim 9, wherein the folding rider platform comprises a planar base plate configured to support feet of the operator in the standing position, and wherein the folded-down position comprises the planar base plate disposed in a horizontal orientation.

11. The system of claim 10, wherein the platform pivot axis is offset from the plane of the planar base plate.

12. The system of claim 10, wherein the planar base plate comprises a nose configured to engage with the resilient member and the rider presence sensor, and wherein the nose comprises a planar member angled relative to the planar base plate.

13. The system of claim 9, wherein the resilient member is secured to a frame member of the mower system.

14. The system of claim 9, wherein a position of the resilient member is adjustable.

15. The system of claim 9, further comprising a second resilient member configured to engage with the folding rider platform while the folding rider platform is in the folded-down position.

16. The system of claim 9, wherein the rider presence sensor comprises a plunger configured to engage with the folding rider platform.

17. A mower system, comprising:
a mower motor;
a mower frame;
a mower deck housing mowing blades; and
a stand-on rider platform system comprising:
- a folding rider platform pivotally coupled to the mower frame, wherein the folding rider platform is configured to pivot between a folded-up position and a folded-down position, the folding rider platform configured to support an operator while the folding rider platform is in the folded-down position; and
- a rider presence sensor secured to a frame member of the mower system and configured to engage with the folding rider platform while the folding rider platform is in the folded-down position, the rider presence sensor configured to sense a presence of an operator standing on the folding rider platform; and
- a folding rider platform suspension system comprising a resilient member configured to be compressed between the frame member and the folding rider platform,
wherein the folding rider platform is configured to pivot about a platform pivot axis to compress the resilient member and engage the rider presence sensor, and
wherein the resilient member is configured to bias the folding rider platform such that (a) the rider presence sensor is in an activated state while the folding rider platform is in the folded-down position without an operator occupying the folding rider platform, and (b) the rider presence sensor is in a deactivated state while the folding rider platform is in the folded-down position with an operator occupying the folding rider platform, wherein the activated state is configured to inhibit an operation of the mower and the deactivated state is configured to enable the operation of the mower.

18. The system of claim 17, wherein the folding rider platform comprises a planar base plate configured to support feet of the operator in the standing position, and wherein the folded-down position comprises the planar base plate disposed in a horizontal orientation.

19. The system of claim 18, wherein the planar base plate comprises a nose configured to engage with the rider presence sensor and the rider presence sensor, and wherein the nose comprises a planar member angled relative to the planar base plate.

20. The system of claim 17, wherein the rider presence sensor comprises a plunger configured to engage with the folding rider platform.

21. The system of claim 17, further comprising a resilient member configured to engage with the folding rider platform while the folding rider platform is in the folded-down position.

* * * * *